US012700329B2

(12) United States Patent
Hwang et al.

(10) Patent No.: US 12,700,329 B2
(45) Date of Patent: Aug. 4, 2026

(54) SIMULATION APPARATUS AND SIMULATION METHOD OF LASER NOTCHING MACHINE FOR SECONDARY BATTERY PRODUCTION

(71) Applicant: LG Energy Solution, Ltd., Seoul (KR)

(72) Inventors: Kyungchul Hwang, Daejeon (KR); Han Seung Kim, Daejeon (KR); Daewoon Jung, Daejeon (KR); Youngduk Kim, Daejeon (KR); Nam Hyuck Kim, Daejeon (KR); Su Ho Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 599 days.

(21) Appl. No.: 18/272,553

(22) PCT Filed: Jul. 14, 2022

(86) PCT No.: PCT/KR2022/010319
§ 371 (c)(1),
(2) Date: Jul. 14, 2023

(87) PCT Pub. No.: WO2023/101128
PCT Pub. Date: Jun. 8, 2023

(65) Prior Publication Data
US 2024/0321140 A1     Sep. 26, 2024

(30) Foreign Application Priority Data
Dec. 1, 2021     (KR) ........................ 10-2021-0170156

(51) Int. Cl.
*G09B 19/24*         (2006.01)
*B23K 26/38*         (2014.01)
(Continued)

(52) U.S. Cl.
CPC .............. *G09B 19/24* (2013.01); *B23K 26/38* (2013.01); *G06Q 10/06398* (2013.01);
(Continued)

(58) Field of Classification Search
USPC ......................................................... 700/117
See application file for complete search history.

(56) References Cited

U.S. PATENT DOCUMENTS 5,854,751 A      12/1998  Di Pietro et al.
2021/0043011 A1     2/2021  Gates

FOREIGN PATENT DOCUMENTS

CA        3103277 A1     1/2020
CN       201429926 Y     3/2010
(Continued)

OTHER PUBLICATIONS

Wilhelm Pfleging, "A review of laser electrode processing for development and manufacturing of lithium-ion batteries", Nanophotonics, 2018, p. 549-573. (Year: 2018).*
(Continued)

*Primary Examiner* — Hien D Khuu
(74) *Attorney, Agent, or Firm* — Bryan Cave Leighton Paisner LLP

(57) ABSTRACT

A simulation apparatus and a simulation method of a laser notching machine for secondary battery production are provided. The simulation apparatus includes: a memory configured to store at least one instruction; and at least one processor configured to execute the at least one instruction stored in the memory. The at least one instruction includes instructions for: executing an apparatus operating unit including a 3D laser notching machine related to secondary battery production, a facility operating unit including a plurality of adjustment parameters for determining the operation of the 3D laser notching machine, a quality
(Continued)

checking unit including quality information related to the quality of a material produced by the 3D laser notching machine, and a laser setting unit including a plurality of laser parameters for determining operation of the 3D laser notching machine; obtaining at least one of first user action information obtained through the apparatus operating unit, first user condition information obtained through the facility operating unit, or first laser setting information obtained through the laser setting unit; determining the operation of the 3D laser notching machine based on at least one of the first user action information, the first user condition information or the first laser setting information obtained; and punching out electrodes related to the 3D laser notching machine based on the determined operation.

23 Claims, 19 Drawing Sheets

(51) Int. Cl.
| | | |
|---|---|---|
| *G06Q 10/0639* | (2023.01) | |
| *G06Q 10/067* | (2023.01) | |
| *G09B 5/02* | (2006.01) | |
| *H01M 4/04* | (2006.01) | |
| *B23K 101/36* | (2006.01) | |

(52) U.S. Cl.
CPC .............. *G06Q 10/067* (2013.01); *G09B 5/02* (2013.01); *H01M 4/04* (2013.01); *B23K 2101/36* (2018.08)

(56) References Cited

FOREIGN PATENT DOCUMENTS

| | | | |
|---|---|---|---|
| CN | 105190724 | A | 12/2015 |
| CN | 206541535 | U | 10/2017 |
| CN | 110737981 | A | 1/2020 |
| CN | 111900336 | A | 11/2020 |
| CN | 112867580 | A | 5/2021 |
| CN | 213211381 | U | 5/2021 |
| CN | 112935600 | A | 6/2021 |
| JP | 5971001 | B2 | 7/2016 |
| JP | 201759444 | A | 3/2017 |
| JP | 2020-184419 | A | 11/2020 |
| JP | 2021173867 | A | 11/2021 |
| KR | 10-1523015 | A | 1/2014 |
| KR | 10-2015-0075547 | A | 7/2015 |
| KR | 101561445 | B1 | 10/2015 |
| KR | 101594656 | B1 | 2/2016 |
| KR | 101933533 | B1 | 4/2019 |
| KR | 102008871 | B1 | 10/2019 |
| KR | 102181983 | B1 | 11/2020 |
| KR | 10-2329089 | B1 | 11/2021 |

OTHER PUBLICATIONS

KR_102181983_B1 (Year: 2020).*
JP_2021173867_A (Year: 2021).*
Li et al. "Development of a Learning-Training Simulator with Virtual Functions for Lathe Operations", Springer-Verlag, 2002, p. 96-104. (Year: 2002).*
KR_102008871_B1 (Year: 2019).*

* cited by examiner

120— Facility operating unit

130— Apparatus operating unit

140— Quality checking unit

150— Laser setting unit

Simulation apparatus ⌐100

3D model apparatus operating unit ⌐210

Quality determination unit ⌐220

Scenario management unit ⌐230

Test execution unit ⌐240

User management unit ⌐250

310

Process and facility
guide step

320

Facility operation
training step

330

Material replacement
training step

340

Condition adjustment
training step

350

Defect case training step

360

Test step

150

| | | |
|---|---|---|
| 810 Tab height offset | 0.00 | +0.1 |
| | | -0.1 |
| 820 Pitch length offset | 0.00 | +0.01 |
| | | -0.01 |

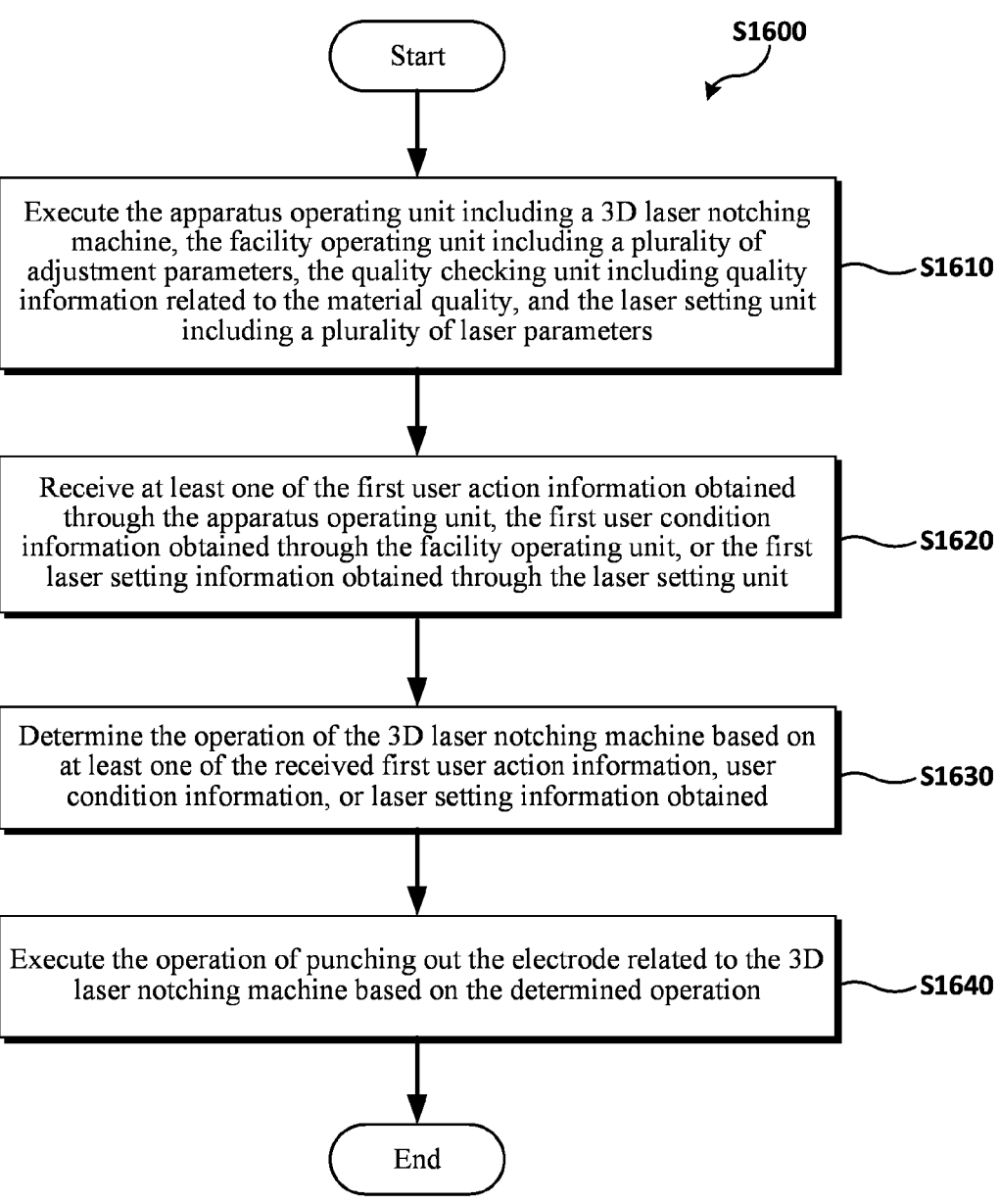

S1600

Start

Execute the apparatus operating unit including a 3D laser notching machine, the facility operating unit including a plurality of adjustment parameters, the quality checking unit including quality information related to the material quality, and the laser setting unit including a plurality of laser parameters — S1610

Receive at least one of the first user action information obtained through the apparatus operating unit, the first user condition information obtained through the facility operating unit, or the first laser setting information obtained through the laser setting unit — S1620

Determine the operation of the 3D laser notching machine based on at least one of the received first user action information, user condition information, or laser setting information obtained — S1630

Execute the operation of punching out the electrode related to the 3D laser notching machine based on the determined operation — S1640

End

*FIG. 16*

SIMULATION APPARATUS AND SIMULATION METHOD OF LASER NOTCHING MACHINE FOR SECONDARY BATTERY PRODUCTION

CROSS-REFERENCE TO RELATED APPLICATION(S)

This application is a National Stage Application of International Application No. PCT/KR2022/010319 filed on Jul. 14, 2022, which claims priority to Korean Patent Application No. 10-2021-0170156 filed on Dec. 1, 2021, the disclosures of which are incorporated herein by reference in their entireties.

FIELD

The present disclosure relates to a simulation apparatus and a simulation method of laser notching machine for secondary battery production and, more specifically, to a simulation apparatus and a simulation method of laser notching machine for training secondary battery production workers.

BACKGROUND

Due to the recent growth of the electric vehicle market, the demand for developing and producing secondary batteries is rapidly increasing. The number of production plants for secondary battery production is also growing in response to the increase in demand for secondary batteries. However, the industry is experiencing a significant shortage of skilled workers for operating secondary battery production plants.

Meanwhile, in the past, training and education of new workers were carried out in such a way of learning a skill by watching experienced workers, but it became difficult to train and educate new workers for a long time due to the busy production schedule of secondary batteries. In addition, it is difficult to find a sufficient number of skilled workers due to the frequent resignation of workers. Also, even if a worker is trained in a general method of operating a factory, it is not easy for the worker to immediately respond to various defect situations that may occur during factory operation.

SUMMARY

To solve the problem above, the present disclosure provides a laser notching machine simulation apparatus (system) and method for secondary battery production, a computer program stored in a computer-readable medium, and a computer-readable medium storing the computer program.

The present disclosure may be implemented in various ways including an apparatus (system) and method, a computer program stored in a computer-readable medium, or a computer-readable medium storing the computer program.

A simulation apparatus of a laser notching machine for secondary battery production according to an embodiment of the present disclosure includes: a memory configured to store at least one instruction; and at least one processor configured to execute at least one instruction stored in the memory. The at least one instruction includes instructions for: executing an apparatus operating unit including a 3D laser notching machine related to secondary battery production, a facility operating unit including a plurality of adjustment parameters for determining the operation of the 3D laser notching machine, a quality checking unit including quality information related to the quality of a material produced by the 3D laser notching machine, and a laser setting unit including a plurality of laser parameters for determining operation of the 3D laser notching machine: obtaining at least one of first user action information obtained through the apparatus operating unit, first user condition information obtained through the facility operating unit, or first laser setting information obtained through the laser setting unit; determining the operation of the 3D laser notching machine based on at least one of the first user action information, the first user condition information or the first laser setting information obtained; and punching out electrodes related to the 3D laser notching machine based on the determined operation.

According to an embodiment, the at least one instruction may further include instructions for: executing a 3D laser notching machine training scenario based on an operating process of the 3D laser notching machine: executing at least one of operating the 3D laser notching machine according to the 3D laser notching machine training scenario, displaying a user action guide on the apparatus operating unit, displaying a user condition guide on the facility operating unit, or displaying a laser setting guide on the laser setting unit: obtaining at least one of the first user action information based on the user action guide display, the first user condition information based on the user condition guide display, or the first laser setting information based on the laser setting guide display; and changing at least one of the apparatus operating unit or the facility operating unit based on at least one of the obtained first user action information, first user condition information, or the first laser setting information.

According to an embodiment, the 3D laser notching machine training scenario may include a material replacement training scenario, and the material replacement training scenario includes at least one of checking a supply unit status, removing a residual amount of an electrode, connecting an electrode, or collecting a sample.

According to an embodiment, the 3D laser notching machine training scenario may include a facility operation training scenario, and the facility operation training scenario includes at least one of checking an operation preparation state, operating a notching facility, or checking a punching-out state.

According to an embodiment, the at least one instruction may further include instructions for: determining one or more quality parameters for determining the quality of a material produced by the 3D laser notching machine: calculating a value corresponding to each of the determined one or more quality parameters based on the operation of the 3D laser notching machine being executed while the operation of the 3D laser notching machine is in execution; and generating quality information related to the quality of a material generated by the 3D laser notching machine based on the calculated value corresponding to each of the one or more quality parameters.

According to an embodiment, the at least one instruction may further include instructions for determining one or more defect scenarios among a plurality of defect scenarios related to the operation of the 3D laser notching machine; and changing at least one of the operation of the 3D laser notching machine or the quality information related to the quality of the material based on the determined one or more defect scenarios.

According to an embodiment, the plurality of defect scenarios may include at least one of a shoulder line defect scenario in which front and rear shoulder line positions of electrodes punched out from the 3D laser notching machine are changed to lie within a predetermined abnormal range, an electrode length defect scenario in which a length of an electrode punched out from the 3D laser notching machine is changed to lie within a predetermined abnormal range, a tab height defect scenario in which a height of an electrode tab punched out from the 3D laser notching machine is changed to lie within a predetermined abnormal range, a pitch defect scenario in which the pitch spacing of electrodes at a specific period punched out from the 3D laser notching machine is changed to lie within a predetermined abnormal range, or a vision position defect scenario in which a measurement position for a vision measurement item is changed to a predetermined abnormal position.

According to an embodiment, the at least one instruction may further include instructions for: executing at least one defect scenario of the shoulder line defect scenario or the electrode length defect scenario:

obtaining at least one of second user action information operating at least a part of the 3D laser notching machine or second user condition information changing adjustment parameters of the facility operating unit: correcting the operation of the 3D laser notching machine based on at least one of the obtained second user action information or second user condition information; calculating a value corresponding to each of one or more quality parameters related to the quality of a material generated by the corrected 3D laser notching machine; and correcting quality information related to the quality of a material generated by the corrected 3D laser notching machine based on the value corresponding to each of the calculated one or more quality parameters.

According to an embodiment, the at least one instruction may further include instructions for: executing at least one defect scenario of the tab height defect scenario or the pitch defect scenario; obtaining at least one of second user action information operating at least a part of the 3D laser notching machine or second laser setting information changing laser parameters of the laser setting unit: correcting the operation of the 3D laser notching machine based on at least one of the obtained second user action information or second laser setting information; calculating a value corresponding to each of one or more quality parameters related to the quality of a material generated by the corrected 3D laser notching machine; and correcting quality information related to the quality of a material generated by the corrected 3D laser notching machine based on the calculated value corresponding to each of the one or more quality parameters.

According to an embodiment, the at least one instruction may further include instructions for: executing the vision position defect scenario: obtaining measurement position offset value change information of a vision program related to the 3D laser notching machine; correcting the vision position based on the obtained measurement position offset value change information; and correcting quality information related to the quality of a material generated by the 3D laser notching machine based on the corrected vision position.

According to an embodiment, the at least one instruction may further include instructions for outputting guide information including information required to resolve the one or more defect scenarios.

A simulation method of a laser notching machine for secondary battery production according to an embodiment of the present disclosure, being performed by at least one processor, includes: executing an apparatus operating unit including a 3D laser notching machine related to secondary battery production, a facility operating unit including a plurality of adjustment parameters for determining the operation of the 3D laser notching machine, a quality checking unit including quality information related to the quality of a material produced by the 3D laser notching machine, and a laser setting unit including a plurality of laser parameters for determining operation of the 3D laser notching machine; obtaining at least one of first user action information obtained through the apparatus operating unit, first user condition information obtained through the facility operating unit, or first laser setting information obtained through the laser setting unit: determining the operation of the 3D laser notching machine based on at least one of the first user action information, the first user condition information or the first laser setting information obtained; and punching out electrodes related to the 3D laser notching machine based on the determined operation.

According to an embodiment, the method may further include: executing a 3D laser notching machine training scenario based on an operating process of the 3D laser notching machine: executing at least one of operating the 3D laser notching machine according to the 3D laser notching machine training scenario, displaying a user action guide on the apparatus operating unit, displaying a user condition guide on the facility operating unit, or displaying a laser setting guide on the laser setting unit: obtaining at least one of the first user action information based on the user action guide display, the first user condition information based on the user condition guide display, or the first laser setting information based on the laser setting guide display; and changing at least one of the apparatus operating unit or the facility operating unit based on at least one of the obtained first user action information, first user condition information, or the first laser setting information.

According to an embodiment, the 3D laser notching machine training scenario may include a material replacement training scenario, and the material replacement training scenario includes at least one of checking a supply unit status, removing a residual amount of an electrode, connecting an electrode, or collecting a sample.

According to an embodiment, the 3D laser notching machine training scenario may include a facility operation training scenario, and the facility operation training scenario includes at least one of checking an operation preparation state, operating a notching facility, or checking a punching-out state.

According to an embodiment, the method may further include: determining one or more quality parameters for determining the quality of a material produced by the 3D laser notching machine: calculating a value corresponding to each of the determined one or more quality parameters based on the operation of the 3D laser notching machine being executed while the operation of the 3D laser notching machine is in execution; and generating quality information related to the quality of a material generated by the 3D laser notching machine based on the value corresponding to each of the calculated one or more quality parameters.

According to an embodiment, the method may further include: determining one or more defect scenarios among a plurality of defect scenarios related to the operation of the 3D laser notching machine; and changing at least one of the operation of the 3D laser notching machine or the quality information related to the quality of the material based on the determined one or more defect scenarios.

According to an embodiment, the plurality of defect scenarios may include at least one of a shoulder line defect scenario in which front and rear shoulder line positions of electrodes punched out from the 3D laser notching machine are changed to lie within a predetermined abnormal range, an electrode length defect scenario in which a length of an electrode punched out from the 3D laser notching machine is changed to lie within a predetermined abnormal range, a tab height defect scenario in which a height of an electrode tab punched out from the 3D laser notching machine is changed to lie within a predetermined abnormal range, a pitch defect scenario in which the pitch spacing of electrodes at a specific period punched out from the 3D laser notching machine is changed to lie within a predetermined abnormal range, or a vision position defect scenario in which a measurement position for a vision measurement item is changed to a predetermined abnormal position.

According to an embodiment, the method may further include: executing at least one defect scenario of the shoulder line defect scenario or the electrode length defect scenario: obtaining at least one of second user action information operating at least a part of the 3D laser notching machine or second user condition information changing adjustment parameters of the facility operating unit: correcting the operation of the 3D laser notching machine based on at least one of the obtained second user action information or second user condition information: calculating a value corresponding to each of one or more quality parameters related to the quality of a material generated by the corrected 3D laser notching machine; and correcting quality information related to the quality of a material generated by the corrected 3D laser notching machine based on the calculated value corresponding to each of the one or more quality parameters.

According to an embodiment, the method may further include: executing at least one defect scenario of the tab height defect scenario or the pitch defect scenario: obtaining at least one of second user action information operating at least a part of the 3D laser notching machine or second laser setting information changing laser parameters of the laser setting unit: correcting the operation of the 3D laser notching machine based on at least one of the obtained second user action information or second laser setting information; calculating a value corresponding to each of one or more quality parameters related to the quality of a material generated by the corrected 3D laser notching machine; and correcting quality information related to the quality of a material generated by the corrected 3D laser notching machine based on the calculated value corresponding to each of the one or more quality parameters.

According to an embodiment, the method may further include: executing the vision position defect scenario: obtaining measurement position offset value change information of a vision program related to the 3D laser notching machine: correcting the vision position based on the obtained measurement position offset value change information; and correcting quality information related to the quality of a material generated by the 3D laser notching machine based on the corrected vision position.

According to an embodiment, the method may further include: outputting guide information including information required to resolve the one or more defect scenarios.

A computer program stored in a computer-readable medium is provided to execute the method according to an embodiment of the present disclosure on a computer.

In various embodiments of the present disclosure, a user performing secondary battery production may perform training related to a method for operating a secondary battery production apparatus, a method for handling a defect situation, and so on through a simulation apparatus before being put into work: through training of the user, the loss due to the occurrence of defects may be considerably reduced so that the efficiency of the secondary battery production task may be improved effectively.

In various embodiments of the present disclosure, by generating a defect scenario based on error information in an actual apparatus, the simulation apparatus may effectively generate training contents optimized for actual work environments.

In various embodiments of the present disclosure, a simulation apparatus may generate and provide a defect scenario having various values related to the malfunction of a secondary battery production apparatus to the user: accordingly, the user may deal with a malfunction situation that may occur in an actual apparatus without help from others and may effectively learn how to respond to various situations.

In various embodiments of the present disclosure, a user may easily learn how to operate a secondary battery production apparatus through the simulation progressed step by step according to the user's task skill level.

In various embodiments of the present disclosure, a user may easily identify and process a defect scenario for which the user lacks training: thus, the user may be trained only in the defect scenario for which the user has low work skills.

In various embodiments of the present disclosure, a user may effectively improve the ability to respond to defects by training using a defect scenario generated based on a malfunction occurring in an actual work environment.

The technical effects of the present disclosure are not limited to the technical effects described above, and other technical effects not mentioned herein may be understood clearly by those with ordinary knowledge in the art (referred to as a "person with ordinary skills") to which the present disclosure belongs from the appended claims.

BRIEF DESCRIPTION OF THE DRAWINGS

Embodiments of the present disclosure will be described with reference to the accompanying drawings described below, wherein similar reference numbers denote similar constituting elements, but the present disclosure is not limited thereto.

7

Figure 8:
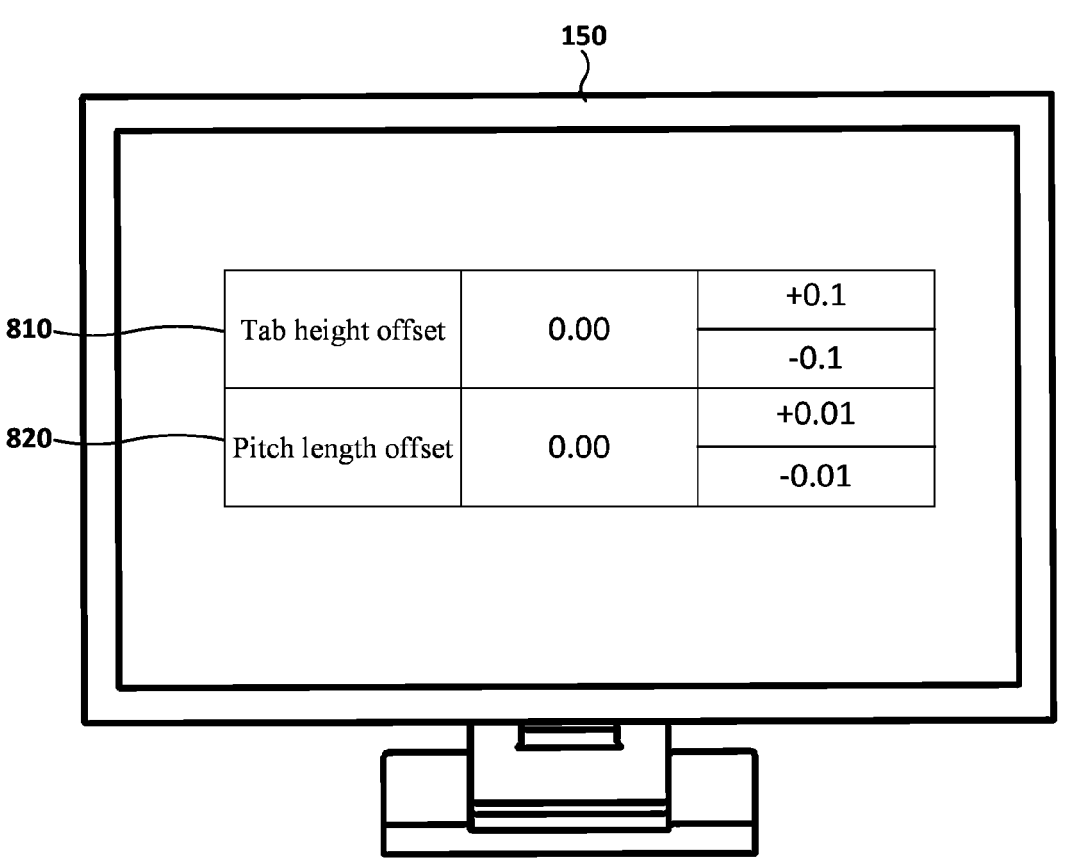

FIG. 8 illustrates an example of a display screen displayed or output on a laser setting unit related to a 3D laser notching machine according to an embodiment of the present disclosure.

Figure 9:
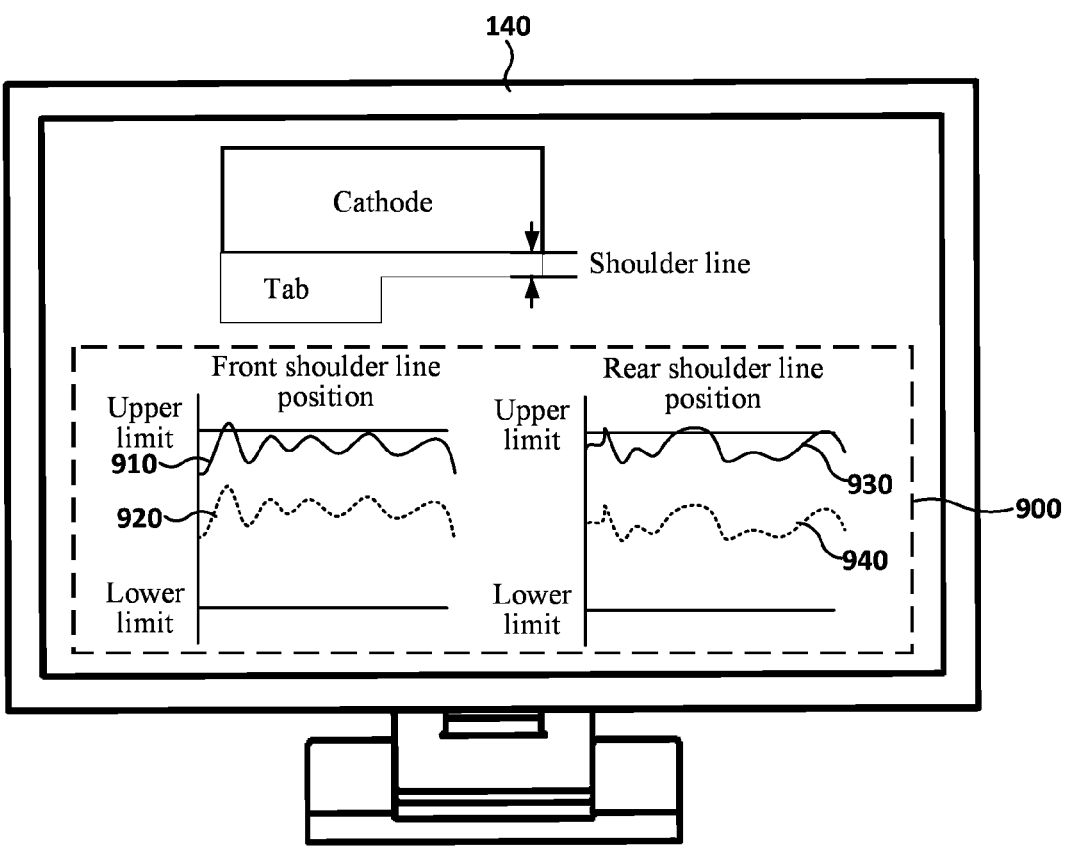

FIG. 9 illustrates an example in which a shoulder line defect scenario has occurred in a quality checking unit according to an embodiment of the present disclosure.

Figure 10:
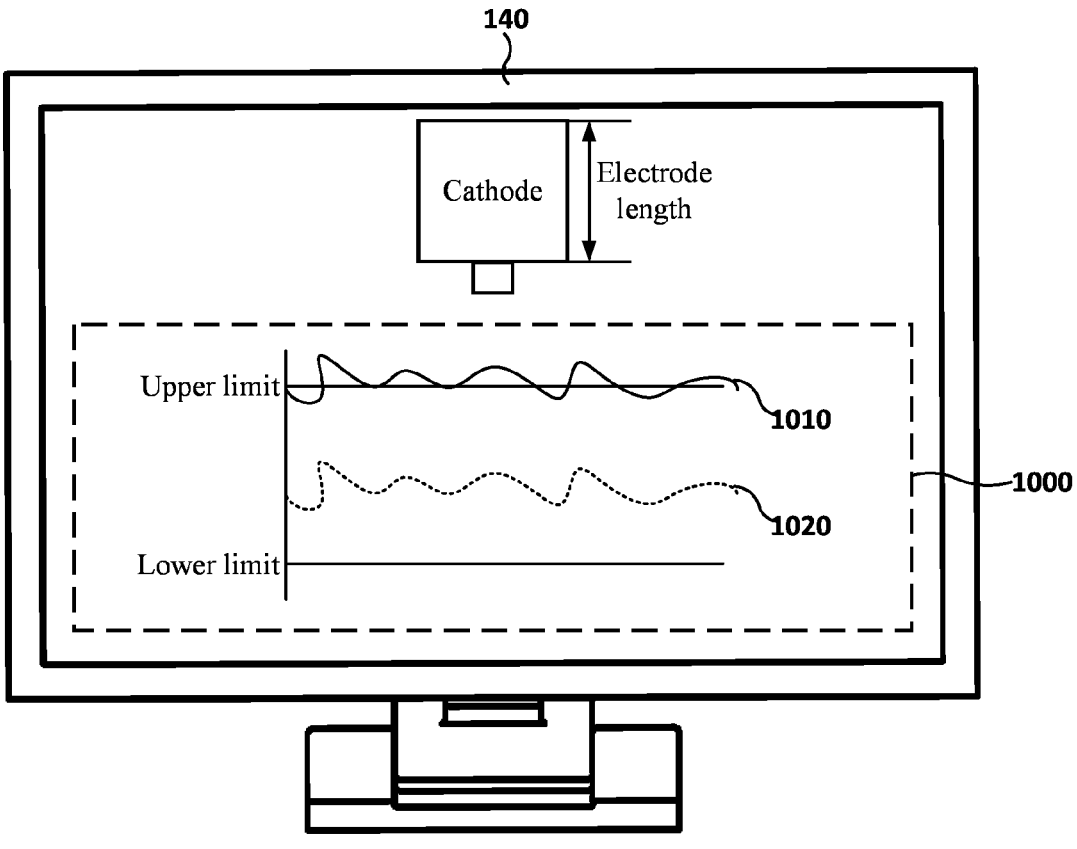

FIG. 10 illustrates an example in which an electrode length defect scenario has occurred in a quality checking unit according to an embodiment of the present invention.

Figure 11:
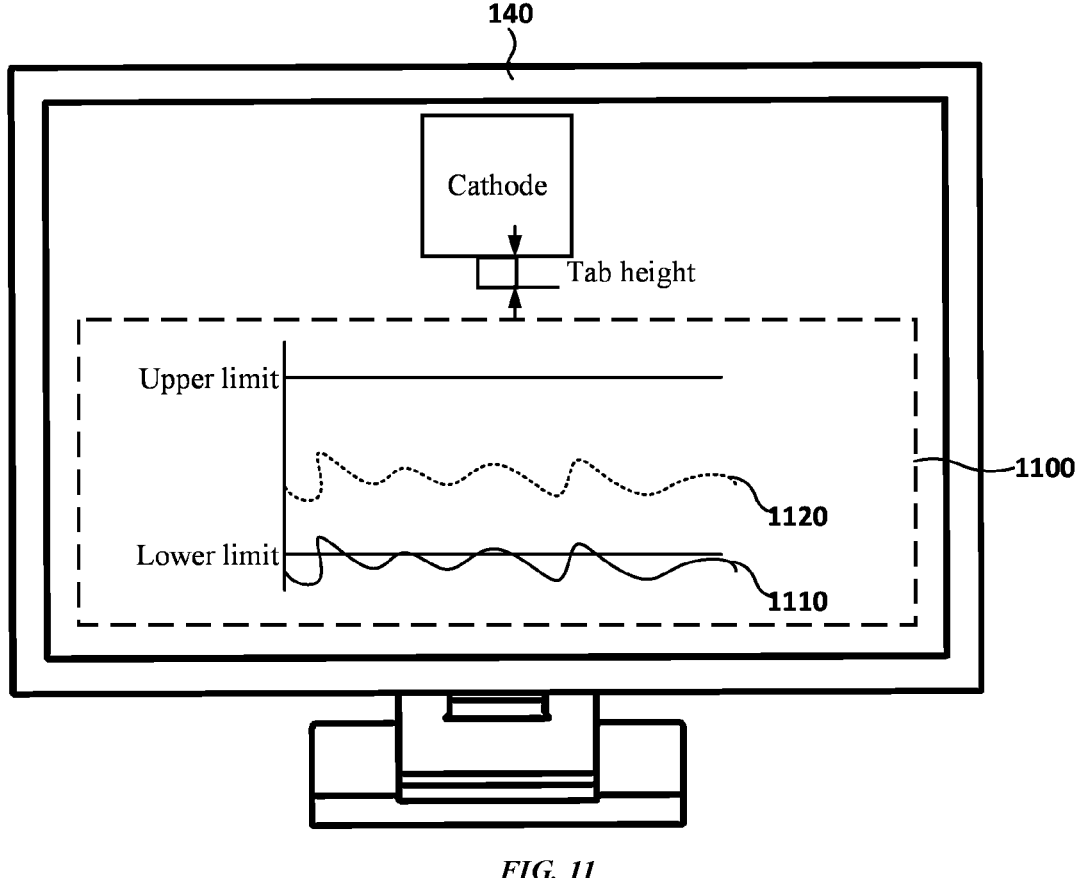

FIG. 11 illustrates an example in which a tab height defect scenario has occurred in a quality checking unit according to an embodiment of the present invention.

Figure 12:
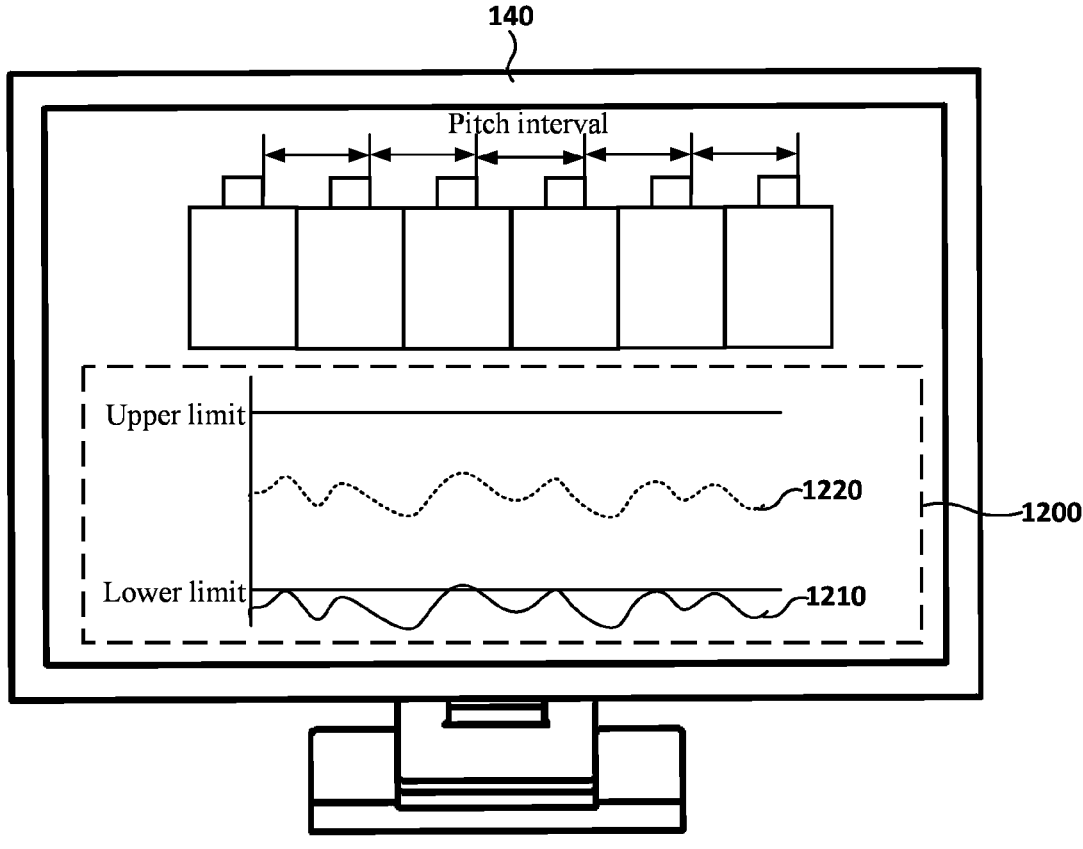

FIG. 12 illustrates an example in which a pitch defect scenario is generated according to an embodiment of the present disclosure.

Figure 13:
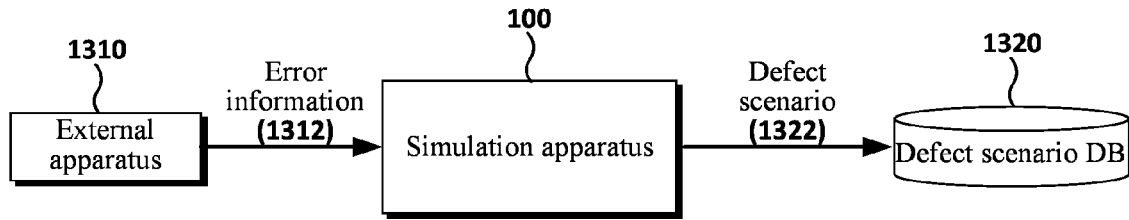

FIG. 13 illustrates an example in which a defect scenario is generated according to an embodiment of the present disclosure.

Figure 14:
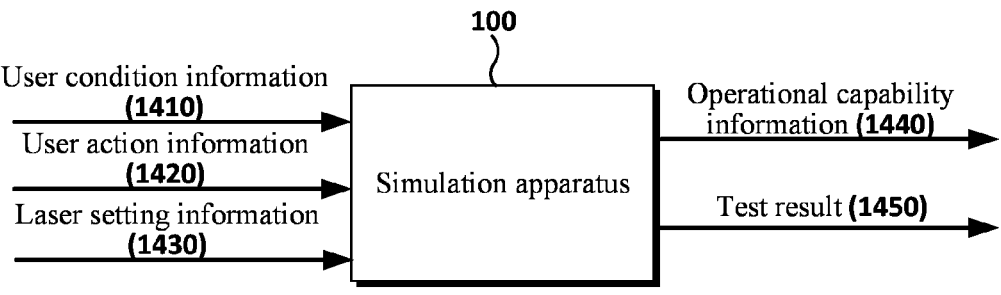

FIG. 14 illustrates an example in which operational capability information and a test result are generated according to an embodiment of the present disclosure.

Figure 15:
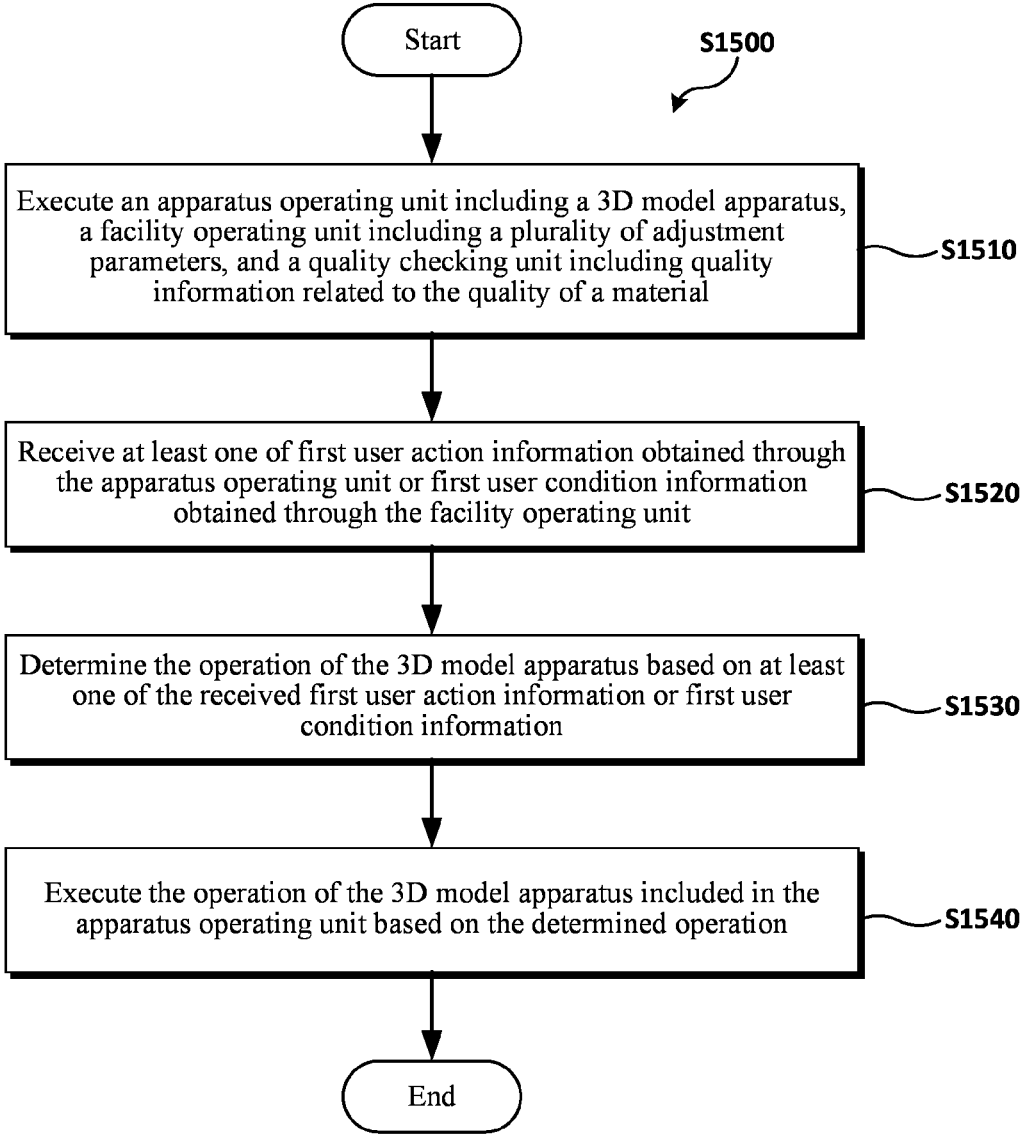

FIG. 15 illustrates an example of a simulation method for secondary battery production according to an embodiment of the present disclosure.

FIG. 16 illustrates an example of a laser notching machine simulation method for secondary battery production according to an embodiment of the present disclosure.

Figure 17:
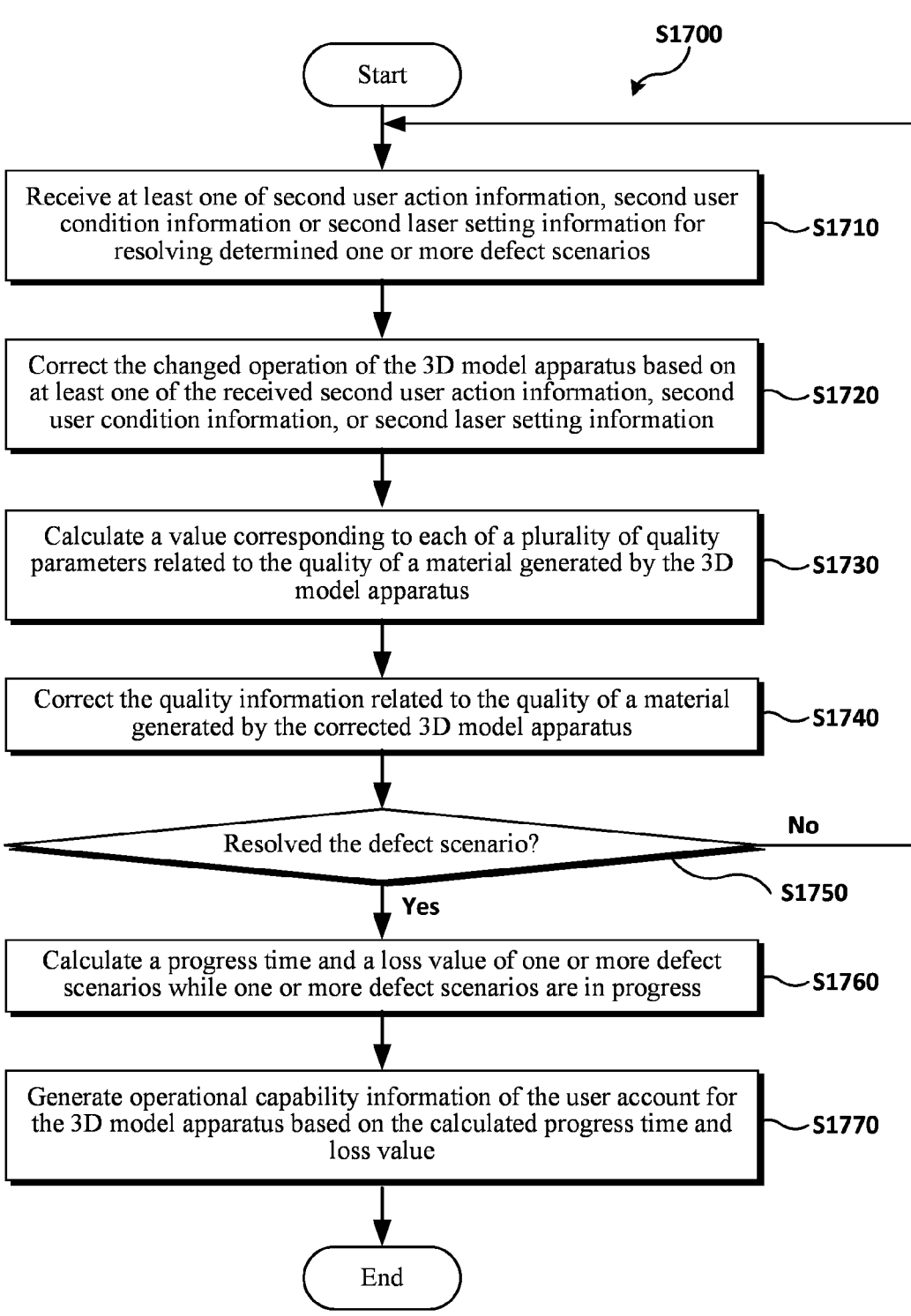

FIG. 17 illustrates an example of a method for calculating a test result according to an embodiment of the present disclosure.

Figure 18:
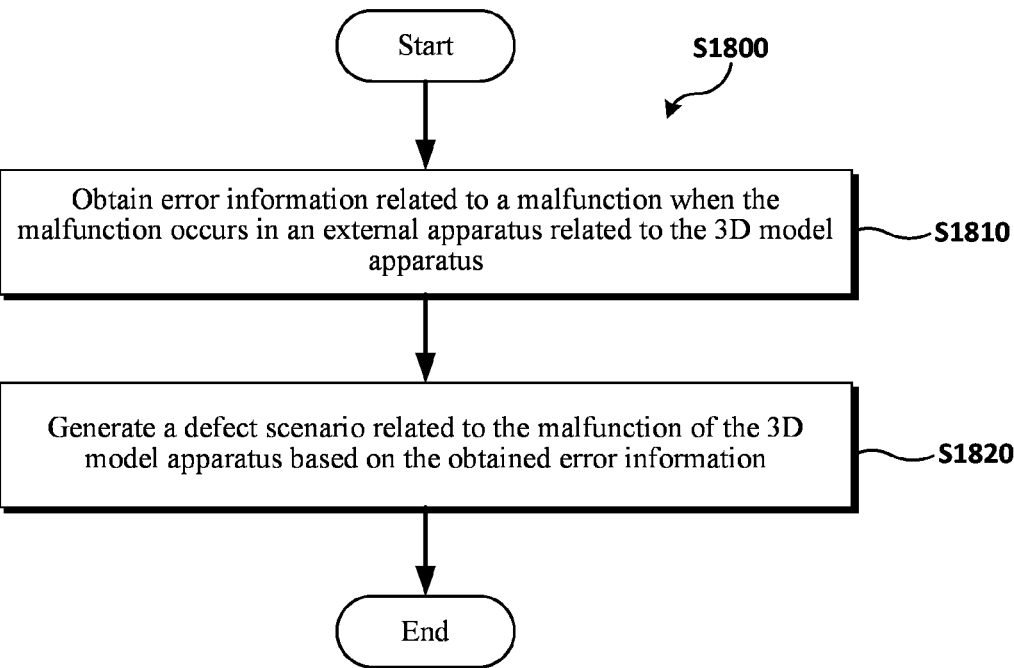

FIG. 18 illustrates an example of a method for generating a defect scenario according to an embodiment of the present disclosure.

Figure 19:
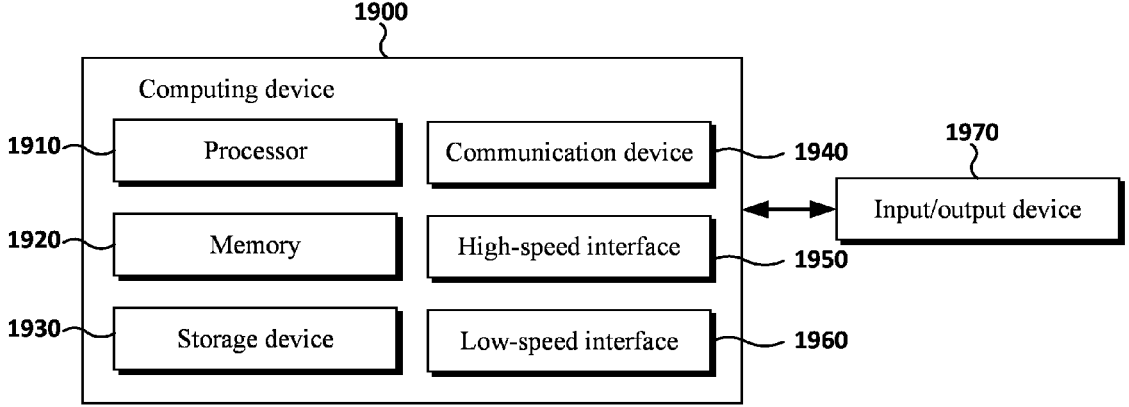

FIG. 19 illustrates an exemplary computing device for performing the method and/or embodiments.

DESCRIPTION OF REFERENCE NUMERALS

100: Simulation apparatus
110: User
120: Facility operating unit
130: Apparatus operating unit
140: Quality checking unit
150: Laser setting unit

DETAILED DESCRIPTION

In what follows, specifics for embodiment of the present disclosure will be described in detail with reference to appended drawings. However, in what follows, if a detailed description of well-known functions or configurations incorporated herein unnecessarily obscure the gist of the present disclosure, the detailed description thereof will be omitted.

In the accompanying drawings, identical or corresponding constituting elements are assigned the same reference numbers. Also, overlapping descriptions of the same or corresponding constituting elements may be omitted in the description of the embodiments below. However, even if descriptions regarding a constituting element are omitted, it should not be interpreted that the constituting element is not included in the corresponding embodiment.

The advantages and features of the present disclosure, and a method for achieving them will be clearly understood with reference to the embodiments described together with appended drawings. However, the present disclosure is not limited to the embodiments disclosed below but may be implemented in various other forms: the present embodiments are provided only to inform those skilled in the art completely of the technical scope of the present disclosure.

Terms used in the present disclosure will be briefly defined, and disclosed embodiments will be described in detail. Terms used in the present disclosure have been selected as much as possible from general terms relevant to the functions of the present disclosure and currently in wide use; however, the selection of terms may be varied depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

In the present disclosure, a singular expression should be understood to include a plural expression unless the context explicitly indicates a singular expression. Also, a plural expression should be understood to include a singular expression unless the context explicitly indicates a plural expression. Throughout the disclosure, unless otherwise explicitly stated, if a particular element is said to include some particular element, it means that the former may further include other particular elements rather than exclude them.

The term "comprises" and/or "comprising" used in the present disclosure indicates the existence of features, steps, operations, components, and/or constituting elements; however, the term does not exclude addition of one or more other functions, steps, operations, components, constituting elements, and/or a combination thereof.

In the present disclosure, when a particular constituting element is referred to as being "coupled to," "combined with," "connected to," "related to," or as "responding to" any other constituting element, the particular constituting element may be directly coupled to, combined with, connected to, and/or related to, or may directly respond to the other constituting element: however, the present disclosure is not limited to the relationship. For example, there may be one or more intermediate constituting elements between a particular constituting element and another constituting element. Also, in the present disclosure, "and/or" may include one or more of the listed items or a combination of at least a portion of one or more of the listed items.

In the present disclosure, the terms such as "first" and "second" are introduced to distinguish one constituting element from the others, and thus the constituting element should not be limited by those terms. For example, a "first" constituting element may be used to indicate a constituting element in a form similar to or the same as a "second" constituting element.

In the present disclosure, a "secondary battery" may refer to the battery made using a material in which the redox process between a current and the material may be repeated several times. For example, to produce a secondary battery, processing such as mixing, coating, roll pressing, slitting, notching and drying, lamination, folding and stacking, lamination and stacking, packaging, charging and discharging, degassing, and characteristics inspection may be performed. In this case, separate production equipment (apparatus) for performing each process may be used. At this time, each production equipment may be operated according to adjustment parameters and configuration values set or changed by a user.

In the present disclosure, a "user" may refer to a worker who performs secondary battery production and operates secondary battery production equipment and may include a user training through a simulation apparatus for secondary battery production equipment. Also, a "user account" is an ID created to use the simulation apparatus or assigned to each user: the user may log into the simulation apparatus using the user account and perform a simulation, but the present disclosure is not limited thereto.

In the present disclosure, the "facility operating unit," "apparatus operating unit," and "quality checking unit" are software programs included in the simulation apparatus or displayed on an input/output device related to the simulation apparatus and/or an input/output device and may refer to a device and/or a program outputting an image or a video of a 3D model apparatus or receiving various inputs from a user and delivering the received inputs to the simulation apparatus.

In the present disclosure, the "3D model apparatus" is a virtual apparatus that implements actual secondary battery production equipment, which may operate in a way that images, videos, or animations of the virtual apparatus are executed, modified, and/or corrected based on the information input by a user. In other words, the "operation of the 3D model apparatus" may include images, videos, and animations of a virtual apparatus executed, modified, and/or corrected. For example, the 3D model apparatus may include apparatus for performing mixing, coating, roll pressing, slitting, notching and drying, lamination, folding and stacking, lamination and stacking, packaging, charging/discharging, degassing, and characteristics inspection. Additionally or alternatively, the 3D model apparatus may be implemented as a 2D model apparatus or implemented together with a 2D model apparatus. In other words, in the present disclosure, the 3D model apparatus is not limited to a 3D model but may include a 2D model. Accordingly, the 3D model apparatus may include terms such as a 2D model apparatus, an animation model apparatus, and a virtual model apparatus.

In the present disclosure, "user condition information" may include a user input that sets or modifies at least a part of conditions and/or values among adjustment parameters or may correspond to the information generated by an arbitrary algorithm predetermined based on the corresponding user input.

In the present invention, 'laser setting information' may include a user input that sets or modifies at least a part of conditions and/or values among laser parameters or may correspond to the information generated by an arbitrary algorithm predetermined based on the corresponding user input.

In the present disclosure, "user action information" may include a user input such as a touch input, a drag input, a pinch input, and a rotation input performed on at least a part of the 3D model apparatus or may correspond to the information generated by an arbitrary algorithm predetermined based on the corresponding user input.

In the present disclosure, a "defect scenario" may be a scenario that changes the operation of a 3D model apparatus within a malfunction range or includes values or conditions for changing quality information of a material determined by the operation of the 3D model apparatus into a defect range. For example, when a defect scenario occurs during the operation of the simulation apparatus, the operation or quality information of the 3D model apparatus may be changed based on the generated defect scenario. Also, when the operation or quality information of the 3D model apparatus changed by the defect scenario is corrected to lie within a normal range, the corresponding defect scenario may be determined as having been resolved.

In the present disclosure, the "training scenario" may include a scenario for operating secondary battery production equipment. For example, suppose the secondary battery production equipment is a laser notching machine: in that case, the training scenario may include a notching facility operation training scenario, a material replacement training scenario, and a condition adjustment training scenario. Through the notching facility operation training scenario, a user may be trained in the facility operation process including checking an operation preparation state, operating a notching facility, and checking a punching-out state; and through the material replacement training scenario, the user may be trained in the material replacement process including checking a supply unit status, removing a residual amount of electrodes, connecting electrodes, and collecting samples. The condition adjustment training scenario includes changing values and conditions for a 3D model apparatus to operate in a malfunction range, and the user may learn a method for checking the malfunction state of the 3D model apparatus and correcting the state to lie within a normal operation range. In other words, the condition adjustment training scenario may be a process of learning a method for resolving various defect scenarios that may occur in a laser notching facility.

In the present disclosure, the "mixing process" may be a process of producing slurry by mixing active material, a binder, and other additives with a solvent. For example, a user may determine or adjust the addition ratio of active material, conductive material, additives, and a binder to produce slurry of specific quality. Also, in the present disclosure, the "coating process" may be a process of applying the slurry on the foil with a particular amount and shape. For example, a user may determine or adjust a coater apparatus's die or slurry temperature to perform coating with a quantity and a shape of specific quality.

In the present disclosure, the "roll pressing process" may be a process in which coated electrodes are passed between two rotating upper and lower rolls and pressed to a certain thickness. For example, a user may determine or adjust the spacing between rolls to maximize the cell capacity by increasing the electrode density through the roll pressing process. Also, in the present disclosure, the "slitting process" may be a process of passing electrodes between two upper and lower rotating knives and cutting the electrodes to have a predetermined width. For example, a user may determine or adjust various adjustment parameters to maintain a constant electrode width.

In the present disclosure, the "notching and drying process" may be a process of removing moisture after punching out an electrode into a particular shape. For example, a user may determine or adjust the shoulder line position or pitch spacing to punch the electrode into a particular shape with specific quality. Also, in the present disclosure, the "lamination process" may be a process of sealing and cutting the electrode and the separator. For example, a user may determine or adjust a value corresponding to the x-axis and a value corresponding to the y-axis to perform cutting at a specific quality.

In the present disclosure, the "package process" may be a process of attaching a lead and a tape to an assembled cell and packaging the assembled cell in an aluminum pouch, and the "degas process" may be a process of removing gas in the cell and re-sealing the cell. Also, in the present disclosure, the "characteristics inspection process" may be a process of checking characteristics such as thickness, weight, and insulation voltage of a cell using a measurement device before shipment of the cell. For the processes above, a user may adjust conditions or values of various adjustment parameters or change configuration values corresponding to the apparatus so that each process is performed with specific quality within a normal range.

Figure 1:
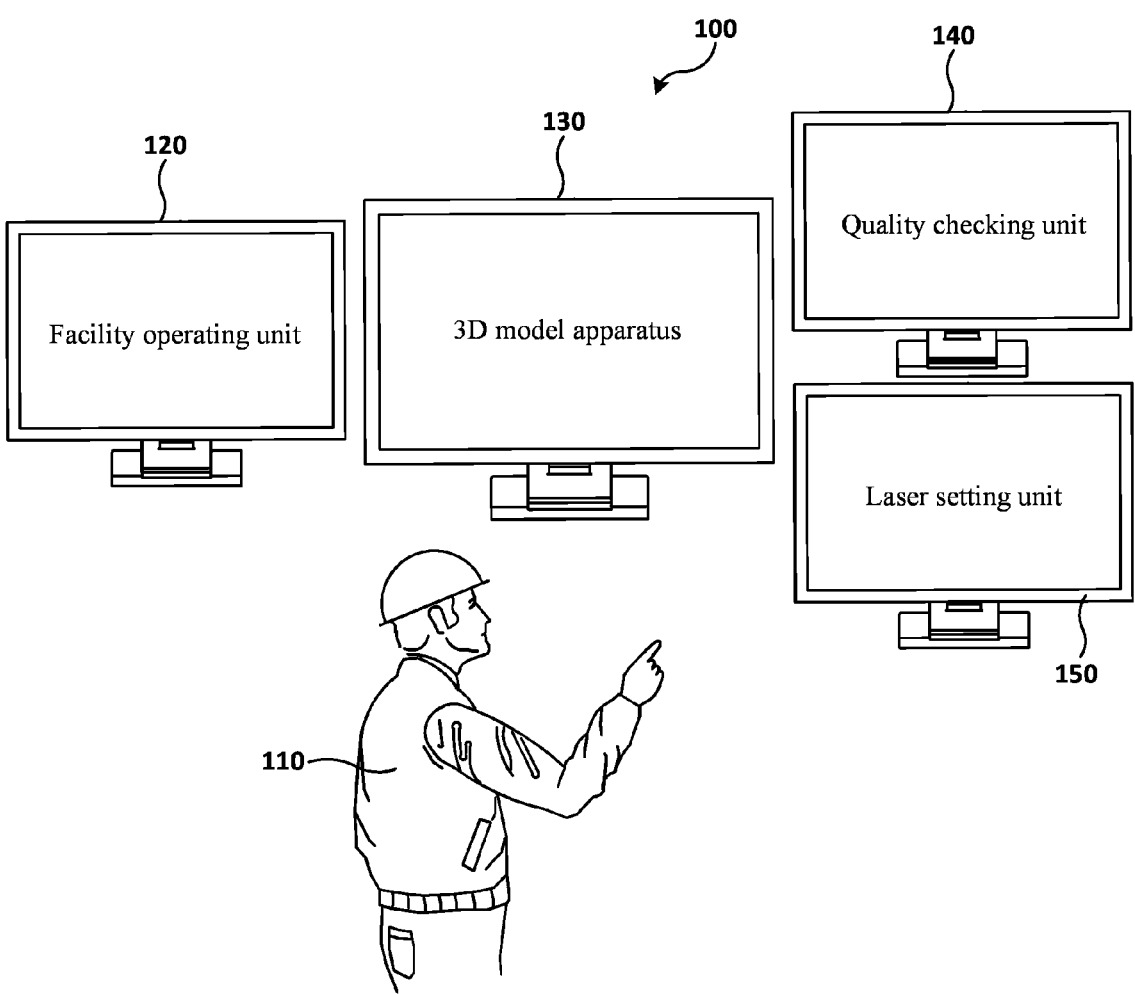
FIG. 1 illustrates an example in which a user uses a simulation apparatus according to an embodiment of the present disclosure.

FIG. 1 illustrates an example in which a user 110 uses a simulation apparatus 100 according to an embodiment of the present disclosure. As shown in the figure, the simulation apparatus 100 is used for training a secondary battery production worker (e.g., user 110) and may include a facility operating unit 120, an apparatus operating unit 130, a quality checking unit 140, and a laser setting unit 150. For example, the user 110 may learn how to use the secondary battery production equipment (e.g., a laser notching machine) or how to respond when the quality of the manufactured product is degraded.

According to an embodiment, the facility operating unit 120 may include a plurality of adjustment parameters for determining the operation of the 3D model apparatus (e.g., a 3D laser notching machine) displayed on the apparatus operating unit 130. The user 110 may execute, change, and/or correct the operation of the 3D model apparatus by changing at least a part of the conditions among a plurality of adjustment parameters. In other words, the operation of the 3D model apparatus may be changed or corrected adaptively as the adjustment parameters input by the user 110 are changed.

The apparatus operating unit 130 may include a 3D model apparatus related to the production of secondary batteries. Here, the 3D model apparatus may include virtual models (e.g., a 2D or 3D model) related to secondary battery production equipment such as, but not limited to, a mixer, a coater, a slitter, a roll presser apparatus, a laser notching apparatus, a laser notching apparatus, a lamination apparatus, and a lamination & stacking (L&S) apparatus and may further include a model of any other apparatus used for the production of secondary batteries. According to an embodiment, the user 110 may manipulate the 3D model apparatus or change the configuration of the 3D model apparatus by applying a touch input, a drag input, or a pinch input to the 3D model apparatus (at least a part of the 3D model apparatus) included in the apparatus operating unit 130. In this case, the user 110 may check or enlarge/reduce an arbitrary area of the 3D model apparatus through view switching, operate the 3D model apparatus by performing a touch input, or change the configuration of the 3D model apparatus. Here, it is assumed that the apparatus operating unit 130 displays a 3D model apparatus related to secondary battery production: however, the present disclosure is not limited to the assumption, and thus, an apparatus related to a specific process in the secondary battery production process may be implemented and displayed as a 2D model apparatus.

The quality checking unit 140 may include quality information related to the quality of the material generated by the 3D model apparatus. Here, the quality information may be generated by performing an operation on the quality parameter based on a predetermined criterion and/or algorithm. In other words, the user 110 may check the quality information generated in response to changing the adjustment parameter or manipulating the 3D model apparatus through the quality checking unit 140. Additionally or alternatively, the quality checking unit 140 of a specific process according to the secondary battery production process may be included in the apparatus operating unit 130. In this case, the quality information may be displayed in association with the 3D model apparatus of the apparatus operating unit 130 or checked by a specific operation of the 3D model apparatus. For example, when a button for quality checking displayed on the apparatus operating unit 130 is selected, quality information may be displayed or output. In another example, the quality information may be displayed or output by a color change of at least a part of an area of the 3D model apparatus.

According to an embodiment, the laser setting unit 150 may include a plurality of laser parameters for determining the operation of the 3D model apparatus (e.g., 3D laser notching machine) displayed on the apparatus operating unit 130. The user 100 may modify the setting information of at least a part of the plurality of laser parameters to execute, modify, and/or correct the operation of the 3D model apparatus. That is, the operation of the 3D model apparatus may be adaptively modified or corrected by a change in the laser parameter input by the user 110.

In FIG. 1, the simulation apparatus 100 is illustrated as including one facility operating unit 120 and one quality checking units 140; however, the present disclosure is not limited to the specific illustration, and an arbitrary number of facility operating units 120 and quality checking units 140 may be employed depending on the type of 3D model apparatus related to the simulation apparatus 100. Based on the configuration, the user 110 performing secondary battery production may be trained in a method for operating the secondary battery production equipment (e.g., a laser notching machine) or a method for responding to a defect situation before being put into work: by training the user 110 as described above, loss due to the occurrence of defects may be considerably reduced, and thus, the efficiency of the secondary battery production task may be improved effectively.

Figure 2:
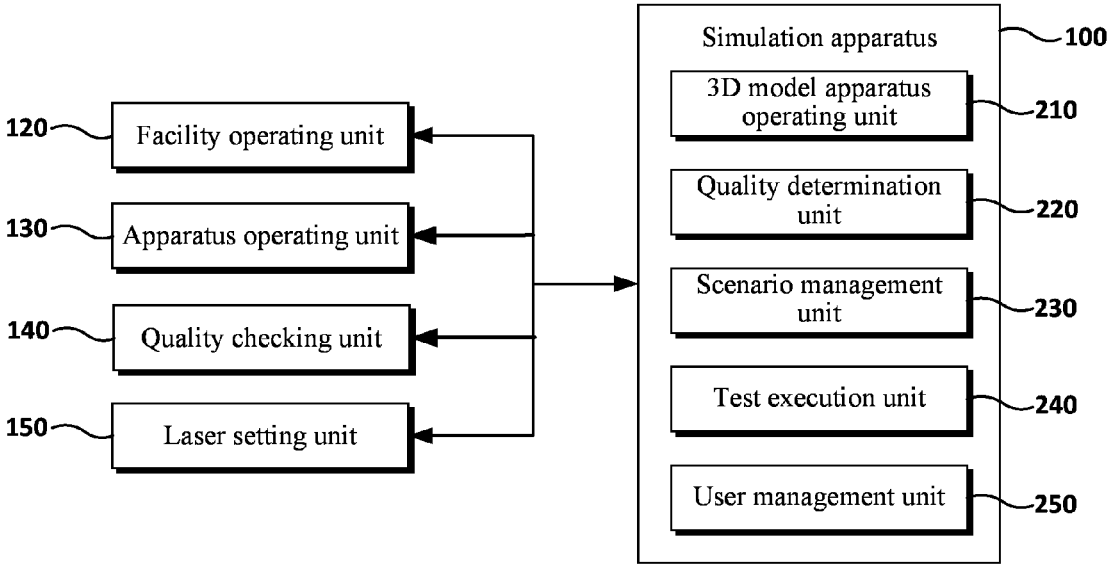
FIG. 2 is a functional diagram illustrating an internal structure of a simulation apparatus according to an embodiment of the present disclosure.

FIG. 2 is a functional diagram illustrating an internal structure of a simulation apparatus 100 according to an embodiment of the present disclosure. As shown in the figure, the simulation apparatus 100 (e.g., at least one processor of the simulation apparatus 100) may include, but not limited to, a 3D model apparatus operating unit 210, a quality determination unit 220, a scenario management unit 230, a test execution unit 240, and a user management unit 250. The simulation apparatus 100 may communicate with the facility operating unit 120, the apparatus operating unit 130, the quality checking unit 140, and the laser setting unit 150 and exchange data and/or information related to the 3D model apparatus.

The 3D model apparatus operating unit 210 may execute, change, and/or correct the operation of the 3D model apparatus displayed on the apparatus operating unit 130 according to a user's manipulation. According to an embodiment, the 3D model apparatus operating unit 210 may obtain or receive user action information, user condition information, and/or laser setting information using information input from the user (e.g., a secondary battery production worker). Then, the 3D model apparatus operating unit 210 may determine or change the operation of the 3D model apparatus using the obtained or received user action information, user condition information, and/or laser setting information. According to an embodiment, the user action information is generated based on a user input such as touching at least a part of an area of the 3D model apparatus included in the apparatus operating unit 130 and may include the information on the amount of change in a setting value of the 3D model apparatus according to the user input. For example, when the 3D model apparatus is a laser notching apparatus for secondary battery production, the user may select a specific area of the laser notching apparatus through the apparatus operating unit 130 by a touch input and operate the laser notching apparatus or replace the electrode materials by removing the residual amount of the electrodes and connecting new electrodes, where, in this case, user action information based on the replaced electrode materials may be generated.

According to an embodiment, the user condition information is generated based on a user input that changes conditions and/or values of at least a part of parameters among a plurality of adjustment parameters included in the facility operating unit 120 and may include the information on the amount of change in a condition value to determine the operation of the 3D model apparatus according to the user input. For example, when the 3D model apparatus is a laser notching apparatus for secondary battery production, the user may change the cutting height offset value to a specific value through the facility operating unit 120; in this case, user condition information based on the changed cutting height offset value may be generated.

According to an embodiment, the laser setting information is information generated based on a user input for changing a condition and/or a value of at least a part of the plurality of laser parameters included in the laser setting unit 150, and may include information on a change amount of a setting value for determining an operation of the 3D model apparatus according to the user input. For example, if the 3D model apparatus is a laser notching machine for secondary battery production, the user may change a pitch interval offset value to a specific value through the laser setting unit 150, and in this case, the laser setting information based on the changed pitch interval offset value may be generated.

As described above, when the operation of the 3D model apparatus is executed based on the user condition information, the user action information and/or the laser setting information, the quality determination unit 220 may determine or generate quality information related to the quality of a material generated by the operation of the 3D model apparatus. In other words, when the 3D model apparatus operates (when animations or images are played to operate the 3D model apparatus), the quality information may be determined or generated differently according to a setting value or a condition value of the corresponding 3D model apparatus. In other words, the user may change or adjust the quality of a material generated by a 3D model apparatus by changing adjustment parameters or setting at least a part of an area of the corresponding 3D model apparatus using a touch input.

According to an embodiment, the quality determination unit 220 may determine or extract one or more quality parameters for determining the quality of a material generated by the 3D model apparatus, and while the operation of the 3D model apparatus is in execution, a value corresponding to each of one or more quality parameters determined based on the operation of the 3D model apparatus under execution may be calculated. Here, a predetermined, arbitrary algorithm may calculate the value corresponding to the quality parameter. Also, the quality determination unit 220 may generate quality information related to the quality of a material generated by the 3D model apparatus based on a value corresponding to each of the one or more quality parameters calculated. For example, when the 3D model apparatus is a laser notching apparatus for secondary battery production and a user adjusts the cutting height offset value, the front and rear shoulder line positions (T Coating, B Coating) may be determined as a quality parameter, and a value corresponding to the shoulder line position may be calculated. In this case, the quality determination unit 220 may generate or output quality information including the calculated electrode shoulder line position.

According to an embodiment, a defect scenario related to a malfunction of the 3D model apparatus may occur during or before the operation of the 3D model apparatus. When a defect scenario occurs as described above, at least a part of the setting values, condition values, and quality information of the 3D model apparatus may be changed to lie between an abnormal range based on the defect scenario. Here, the abnormal range may mean a range in which the quality information related to the quality of a material deviates from the upper and lower limits of a preconfigured specification.

According to an embodiment, the scenario management unit 230 may determine one or more defect scenarios among a plurality of defect scenarios related to a malfunction of the 3D model apparatus and, based on the determined one or more defect scenarios, may change at least one of the operation of the 3D model apparatus or the quality information related to quality of the material. For example, when the 3D model apparatus is a laser notching apparatus, the plurality of defect scenarios may include an electrode shoulder line defect, a pitch defect, an electrode length defect, a tab height defect, and a vision position defect. In this case, the scenario management unit 230 may determine a defect scenario by extracting at least one from among an electrode shoulder line defect, a pitch defect, an electrode length defect, a tab height defect, and a vision position defect and change the adjustment parameter, the laser parameter, operation, and quality information of the 3D model apparatus according to the extracted or determined defect scenario.

According to an embodiment, when a defect scenario occurs, the user may modify the adjustment parameter or modify the laser parameter or change the settings of the 3D model apparatus to solve the occurred defect scenario. In this case, the scenario management unit 230 may receive at least one of user action information, user condition information, or laser setting information for resolving the determined one or more defect scenarios, and correct the operation of the 3D model apparatus changed based on at least one of the received user action information, user condition information or laser setting information. Also, while the operation of the corrected 3D model apparatus is in execution, the scenario management unit 230 may calculate a value corresponding to each of a plurality of quality parameters related to the quality of a material generated by the 3D model apparatus based on the operation of the 3D model apparatus in execution and may correct the quality information related to the quality of a material generated by the corrected 3D model apparatus based on the value corresponding to each of the plurality of calculated quality parameters.

Then, the scenario management unit 230 may determine whether one or more defect scenarios have been resolved using the corrected quality information. For example, when the quality of a material falls within a predetermined normal range, the scenario management unit 230 may determine that the defect scenario has been resolved, but the present disclosure is not limited to the specific operation: when the value of each quality parameter included in the quality information lies within a predetermined normal range or corresponds to a specific value, the scenario management unit 230 may determine that the defect scenario has been resolved. Additionally or alternatively, when a value calculated by providing each quality parameter to an arbitrary algorithm falls within a predetermined normal range, the scenario management unit 230 may determine that the defect scenario has been resolved.

According to an embodiment, a setting value and a condition value of the 3D model apparatus changed to lie within the range of a malfunction by a defect scenario may be determined in advance for each defect scenario, but the present disclosure is not limited to the specific operation. For example, the defect scenario may be generated based on error information generated when actual secondary battery production equipment malfunctions. In other words, when a malfunction occurs in an external device (e.g., actual secondary battery production equipment) related to the 3D model apparatus, the scenario management unit 230 may obtain error information related to the malfunction and, based on the obtained error information, may generate a defect scenario related to the malfunction of the 3D model apparatus. For example, when a malfunction occurs in the slitting process, which is a preceding process of the laser notching machine from a secondary battery production line, the scenario management unit 230 may obtain a value of each adjustment parameter and a setting value at the time of malfunction in the slitting equipment as error information. The scenario manager 230 may generate a defect scenario by changing the obtained value of each adjustment parameter and each obtained setting value of the apparatus to correspond to the 3D model apparatus. Since a defect scenario is generated based on the error information from an actual apparatus using the configuration above, the simulation apparatus 100 may effectively generate training contents optimized for actual work environments.

According to an embodiment, the test execution unit 240 may determine whether one or more defect scenarios have been resolved using the corrected quality information; when it is determined that one or more defect scenarios have been resolved, the test execution unit 240 may calculate a progress time and a loss value of one or more defect scenarios while one or more defect scenarios are in progress. For example, the loss value may include a coating loss value and a material loss value and may be calculated through a predetermined, arbitrary algorithm based on a user's response time, a user input value, and the like. Also, the test execution unit 240 may generate operational capability information of the 3D model apparatus for a user account based on the calculated progress time and loss value. Here, the user account may refer to an account of a worker who uses the simulation apparatus 100, and the operational capability information represents the work skill level of the user, which may include a work speed, time taken for responding to a defect, the number of NGs, degree of proximity to a target value, and an evaluation score. Additionally, when the corresponding user solves all predetermined types of defect scenarios, the test execution unit 240 may determine whether the user passes a simulation training based on the operational capability information for each defect scenario.

The user management unit 250 may perform management such as registration, modification, and deletion of a user account related to a user who uses the simulation apparatus 100. According to an embodiment, the user may use the simulation apparatus 100 using the user's registered user account. In this case, the user management unit 250 may store and manage information on whether each defect scenario has been resolved and operational capability information for dealing with each defect scenario in an arbitrary database for each user account. Using the information stored by the user management unit 250, the scenario management unit 230 may extract information related to a specific user account stored in the database and extract or determine at least one scenario among a plurality of defect scenarios based on the extracted information. For example, the scenario management unit 230 may extract only a defect scenario in which the working speed is lower than an average working speed based on the information related to the user account or provide the extracted defect scenario to the corresponding user, but the present disclosure is not limited to the specific operation: the defect scenario may be extracted or determined by another arbitrary criterion or a combination of arbitrary criteria.

In FIG. 2, it is assumed that functional configurations included in the simulation apparatus 100 are different from each other; however, the assumption is intended only to help understand the disclosure, and one computing device may perform two or more functions. Also, the simulation apparatus 100 of FIG. 2 assumes to be distinguished from the facility operating unit 120, the apparatus operating unit 130, the quality checking unit 140 and the laser setting unit 150; however, the present disclosure is not limited to the assumption, and the facility operating unit 120, the apparatus operating unit 130, the quality checking unit 140 and the laser setting unit 150 may be included in the simulation apparatus 100. Using the configuration above, the simulation apparatus 100 may generate a training scenario and a defect scenario having various values related to the operation of the secondary battery production equipment and provide the generated scenarios to the user; accordingly, the user may be trained in a method for operating secondary battery production equipment and resolve a malfunction situation that may occur in an actual apparatus without help from others and effectively learn how to respond to each situation.

Figure 3:
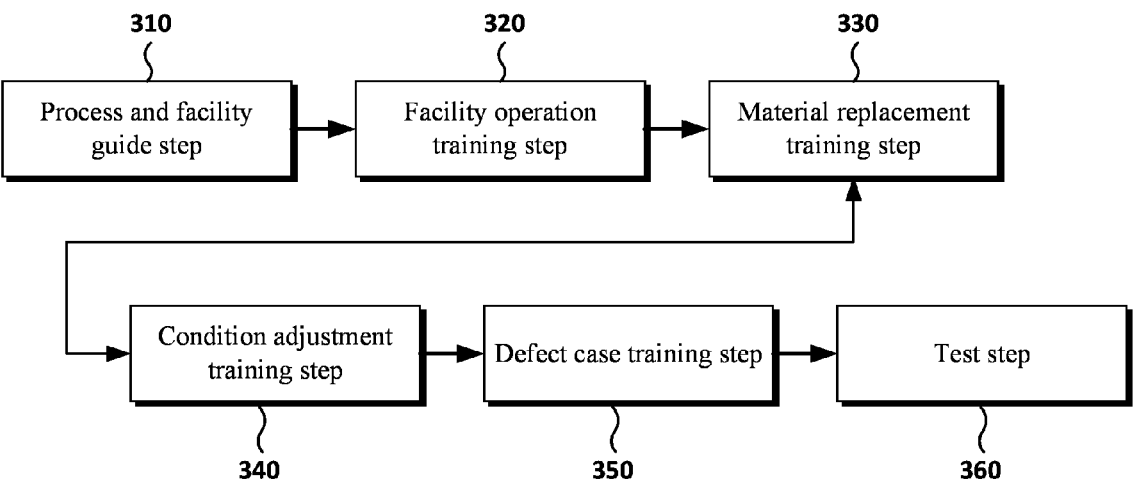
FIG. 3 is a block diagram illustrating an example in which a simulation apparatus operates according to an embodiment of the present disclosure.

FIG. 3 is a block diagram illustrating an example in which a simulation apparatus operates according to an embodiment of the present disclosure. As shown in the figure, the simulation apparatus (100 in FIG. 1) may operate through processes such as a process and facility guide step 310, a facility operation training step 320, a material replacement training step 330, a condition adjustment training step 340, a defect case training step 350, and a test step 360. In other words, the user may be trained in a method for operating secondary battery production equipment through the steps 310, 320, 330, 340, 350, 360.

The process and facility guide step 310 may be a step for describing secondary battery production processes or equipment. When the 3D model apparatus is a laser notching apparatus, the step may include a description of the laser notching process, a description of the main part of the laser notching apparatus, a description of the vision measurement items (shoulder line, pitch, or electrode length) of vision equipment, and a description of the measurement position for each vision measurement item. The process and facility guide step 310 may be a step of learning types of various adjustment parameters included in the facility operating unit and a method for manipulating adjustment parameters. For example, a work specification (images, videos, and animations indicating the work specification) indicating the types of adjustment parameters and a method for manipulating adjustment parameters may be displayed or output on the facility operating unit, the apparatus operating unit, and the like. Additionally, a portion of the screen may be turned on or activated so that the user may perform a task corresponding to the work specification. In this case, the user may be trained in how to use the facility operating unit by manipulating a condition and/or a value of an arbitrary adjustment parameter corresponding to the work specification. When the user touches a button for a predetermined time according to the work specification or enters a correct value corresponding to an arbitrary parameter, the next step may be performed, or a button that leads to the next step (e.g., NEXT button) may be displayed or activated.

The facility operation training step 320 may be a step in which a user learns how to operate the laser notching apparatus, including checking the operation preparation state, operating a notching facility, and checking a punching-out state. The guide information may be displayed or output on the 3D model apparatus according to the scenario of each training step, along with the type of adjustment parameter to be manipulated for operating, checking, and adjusting the 3D model apparatus, the value of the adjustment parameter, the type of the laser parameter, and the value of the laser parameter. In other words, the guide information may be displayed or output on the facility operating unit and the apparatus operating unit, and a portion of the screen may be turned on or activated so that the user may perform a task corresponding to the guide information. In this case, the user may operate the facility operating unit and the apparatus operating unit corresponding to the guide information and input setting values: when one task is completed, the next step may be performed, or a button that leads to the next step (e.g., NEXT button) may be displayed or activated. Thus, the user may be trained in the process of operating a laser notching apparatus for secondary battery production based on the displayed information.

The material replacement training step 330 may be a step in which a user learns how to replace electrode materials of the laser notching apparatus, including checking a supply unit status, removing a residual amount of an electrode, connecting an electrode, and collecting a sample. The guide information may be displayed or output on the 3D model apparatus according to the scenario of each training step, along with the type of adjustment parameter to be manipulated for operating, checking, and adjusting the 3D model apparatus and the value of the adjustment parameter. In other words, the guide information may be displayed or output on the facility operating unit and the apparatus operating unit, and a portion of the screen may be turned on or activated so that the user may perform a task corresponding to the guide information. In this case, the user may operate the facility operating unit and the apparatus operating unit corresponding to the guide information and input setting values: when one task is completed, the next step may be performed, or a button that leads to the next step (e.g., NEXT button) may be displayed or activated. Thus, the user may be trained in the material replacement process of the laser notching apparatus for secondary battery production based on the displayed information.

The condition adjustment training step 340 may be a step in which a user learns the quality change of a material generated by the 3D model apparatus according to the value of the adjustment parameter of the facility operating unit, the value of the laser parameter of the laser setting unit, and the state of the apparatus operating unit. The condition adjustment training step 340 may be a step in which one of material information related to the operation of the 3D laser notching machine for the secondary battery production apparatus and the quality of a material produced by the 3D laser notching machine may be changed to lie within an abnormal range, and the user checks the abnormal state and learns a method for correcting the abnormal state into a normal state. In other words, the condition adjustment training step 340 is a step in which the user learns how to check and take action on the defect that occurs during the operation of the secondary battery production apparatus, where a defect may occur in the 3D laser notching machine, and at the occurrence of the defect, type of the adjustment parameter to be manipulated for resolving the defect, the value of the adjustment parameter, the type of the laser parameter, the value of the laser parameter, and a setting value of the 3D model apparatus may be displayed or output. The user may deal with a defect based on the displayed information and learn a method for resolving the defect.

For example, in the shoulder line defect training, the positions of the front and rear shoulder lines of electrodes may be changed to lie within an abnormal range that deviates from the upper or lower limit of a predetermined specification: in the pitch defect training, the pitch interval of the electrode may be changed to lie within an abnormal range that deviates from the upper or lower limit of the predetermined specification; in the electrode length defect training, a length of the electrode may be changed to lie within an abnormal range that deviates from the upper or lower limit of the predetermined specification; in the tab height defect training, a tab height of the electrode may be changed to lie within an abnormal range that deviates from the upper or lower limit of the predetermined specification; and in the vision position defect training, the measurement position for each vision measurement item may be changed to a predetermined specific abnormal position. If the measurement position of the vision measurement item is changed to an abnormal position, the quality information obtained through the vision equipment may be displayed as the abnormal state that deviates from the upper or lower limit of the specification even if the actual punching-out state of the electrode is normal. In other words, in the case of the vision position defect, even if the punching-out state of the electrode is normal, it may be displayed or output as a punching state defect, such as the shoulder line defect or the pitch defect.

The type of adjustment parameter that has to be manipulated to resolve the abnormal situation, the value of the adjustment parameter, the type of laser parameter, the value of laser parameter, and the guide information on the operation of the 3D model apparatus may be displayed or output on the facility operating unit and the apparatus operating unit; and a portion of the screen may be turned on or activated so that the user may perform a task corresponding to the information. In this case, the user may manipulate the facility operating unit, the apparatus operating unit and the laser setting unit corresponding to the guide information and input setting values: when one task is completed, the next step may be performed, or a button that leads to the next step (e.g., NEXT button) may be displayed or activated. Thus, the user may learn a method for correcting the abnormal range into a normal range based on the displayed information.

The defect case training step 350 may be a step in which a user repeatedly processes or resolves each defect scenario or a combination of a plurality of defect scenarios related to a secondary battery production apparatus to master a defect-solving method. For example, the user may directly select one defect scenario among a plurality of defect scenarios and be trained in the selected scenario, but the present disclosure is not limited to the operation: the user may be trained in a defect scenario determined randomly by the simulation apparatus. The defect case training step 350 may be a step in which the user learns to handle various defect scenarios for which the user has been trained in the condition adjustment training step 340. When a user manipulates a specific adjustment parameter or changes a setting value of the 3D model apparatus to respond to a defect scenario given randomly, the operation of the 3D model apparatus and the quality of a material related to the 3D model apparatus may be changed in real-time. By checking the changed quality, the user may resolve the defect scenario through repeated training and improve the skill in coping with the defect.

The test step 360 may be a step evaluating the operational capability of a user by testing the process through which the user resolves a defect scenario. For example, when a user resolves each defect scenario, the operational capability of the user may be measured or evaluated based on a work speed, time taken for responding to a defect, the number of NGs, degree of proximity to a target value, and a loss value. The user may additionally learn or train for an incomplete defect scenario by checking the operational capability and whether the user has passed the test.

Although FIG. 3 assumes that each step is sequentially performed, the present disclosure is not limited to the assumption, and some of the steps may be omitted. Also, the order of performing the steps may be changed. For example, after the testing step 360, the defect case training step 350 to the condition adjustment training step 340 may be performed. Based on the configuration, the user may easily learn how to operate the secondary battery production apparatus and how to deal with malfunctions through the simulation progressed step by step according to the user's task skill.

Figure 4:
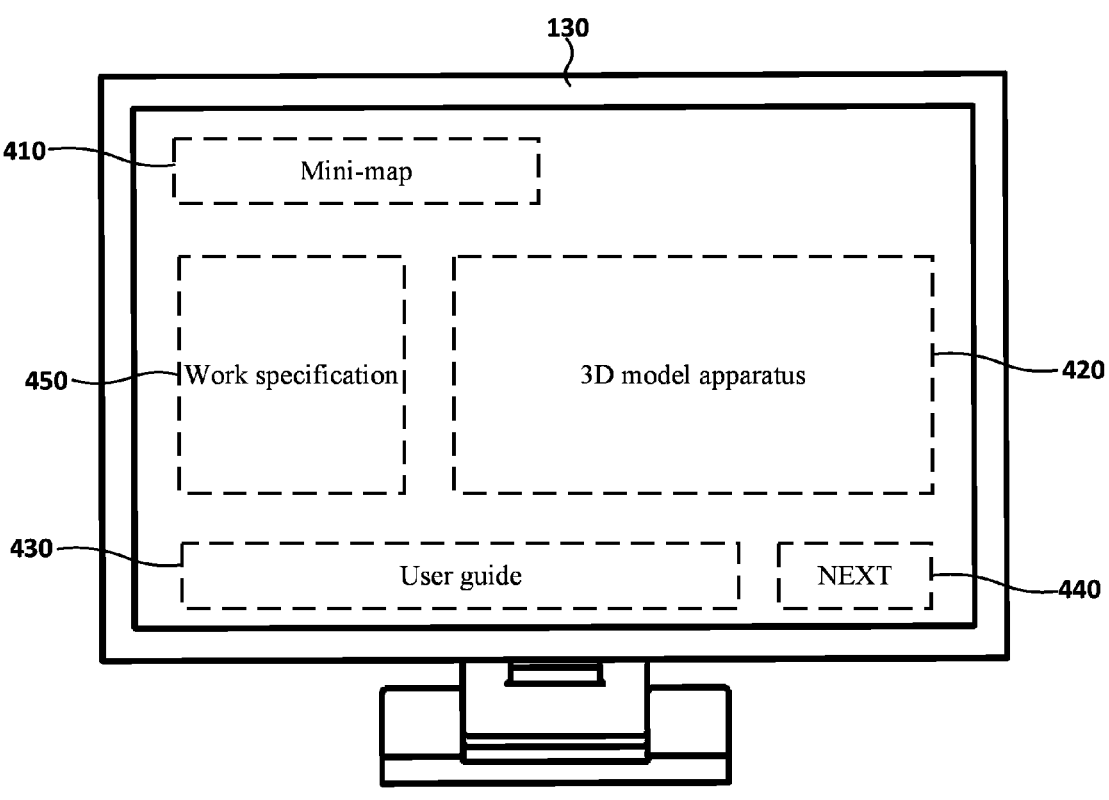
FIG. 4 illustrates an example of a display screen displayed or output on an apparatus operating unit according to an embodiment of the present disclosure.

FIG. 4 illustrates an example of a display screen displayed or output on an apparatus operating unit 130 according to an embodiment of the present disclosure. As shown in the figure, the apparatus operating unit 130 may display or output text, an image, and a video including a mini-map 410, a 3D model apparatus 420, a user guide 430, NEXT button 440, and a work specification 450 on the display screen. FIG. 4 assumes that the mini-map 410, the 3D model apparatus 420, the user guide 430, the NEXT button 440, and the work specification 450 are displayed in a specific area on the display screen, but the present disclosure is not limited to the assumption; each of the text, image, and video may be displayed in an arbitrary area of the display screen.

The mini-map 410 briefly displays the entire laser notching apparatus for secondary battery production, and the approximate position of the area displayed on the 3D model apparatus 420 out of the entire laser notching apparatus is displayed as a rectangular box. When the apparatus displayed on the 3D model apparatus 420 is changed, the position and size of the rectangular box displayed on the mini-map 410 may also be changed in real-time. For example, the mini-map 410 may perform the function of a position guide map of the laser notching apparatus.

The 3D model apparatus 420 may be a 3D image or video that implements the secondary battery production equipment in a 3D form. For example, the 3D model apparatus 420 may operate based on the user condition information and/or user action information input from a user.

The user guide 430 may be the information for guiding a user's next action, which includes information necessary to operate the 3D model apparatus 420, user condition information, user action information and laser setting information required to solve a training scenario, and so on. In other words, even when the user does not know how to operate the simulation apparatus, the user may be trained in a method for operating the simulation apparatus and a method for dealing with a defect using the user guide 430.

When the condition value or setting value of the 3D model apparatus is determined or the 3D model apparatus 420 is operated using the displayed user guide 430, the corresponding step is resolved, and the NEXT button 440 for proceed-ing to the next step may be activated. The user may select the activated NEXT button 440 through a touch input to perform training corresponding to the next step.

The work specification 450 is a document containing initial setting values and condition values of the 3D model apparatus 420 and may be predetermined or generated by a particular algorithm. For example, the simulation apparatus may receive and provide the contents of the work specification used to operate actual secondary battery production equipment or generate a new work specification by calculating the initial setting values and condition values of the 3D model apparatus 420 based on a plurality of input work specifications.

Figure 5:
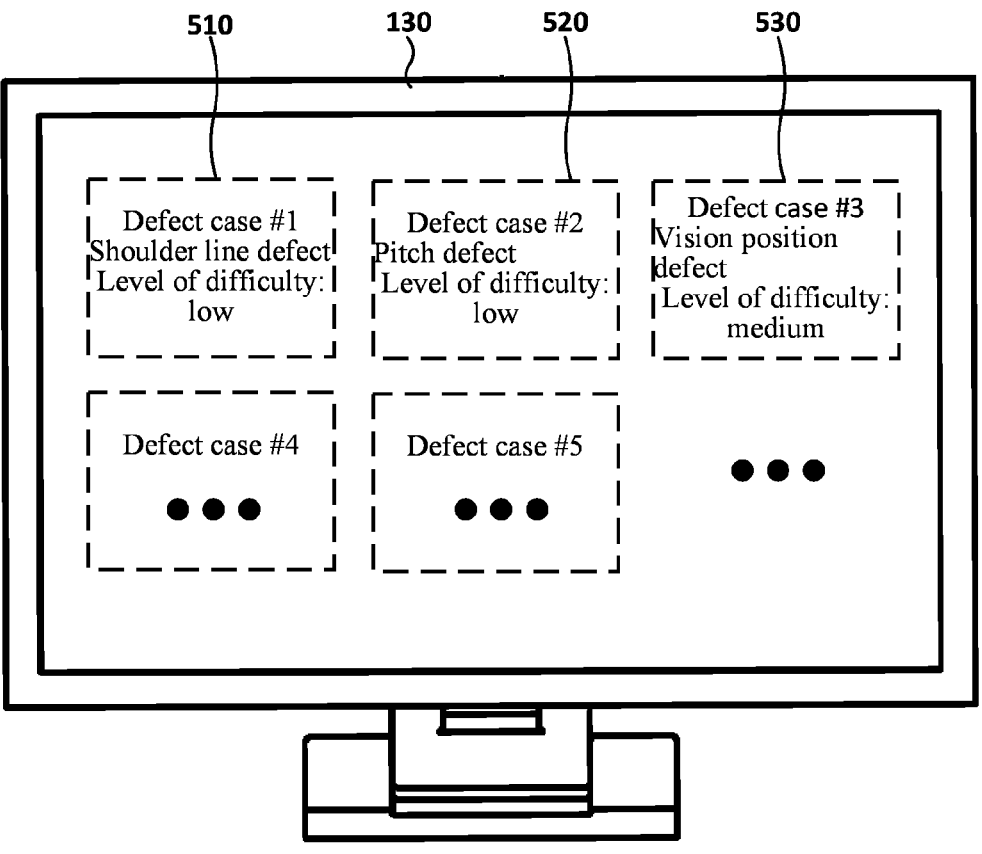
FIG. 5 illustrates an example of a display screen displayed or output on an apparatus operating unit according to another embodiment of the present disclosure.

FIG. 5 illustrates an example of a display screen displayed or output on an apparatus operating unit 130 according to another embodiment of the present disclosure. As shown in the figure, the apparatus operating unit 130 may display or output text, an image, or a video including a plurality of defect scenarios 510, 520, 530 on the display screen. FIG. 5 assumes that a first defect scenario 510, a second defect scenario 520, and a third defect scenario 530 are displayed in specific areas on the display screen, but the present disclosure is not limited to the assumption: each text, image, or video may be displayed in any position on the display screen.

According to an embodiment, each defect scenario may include details and the level of difficulty of the defect scenario. For example, the first defect scenario 510 may be a shoulder line defect with a low level of difficulty, the second defect scenario 520 may be a pitch defect with a low level of difficulty, and the third defect scenario 530 may be a vision position defect with a medium level of difficulty. A user may select at least a part of the plurality of defect scenarios 510, 520, 530 displayed on the display screen through a touch input to perform training based on the selected defect scenario.

Additionally or alternatively, one defect scenario among the plurality of defect scenarios 510, 520, 530 may be determined by a predetermined algorithm. For example, through a user account (or information related to the user account) of a user performing training, the simulation apparatus may determine a defect scenario for which the user is not fully skilled or a combination of defect scenarios. Here, the user's work skill level may be calculated or determined as a test result for each defect scenario, but the present disclosure is not limited to the specific scheme. Based on the configuration, the user may easily identify and process a defect scenario for which the user lacks training: thus, the user may be trained only in the defect scenario for which the user has low work skills.

Figure 6:
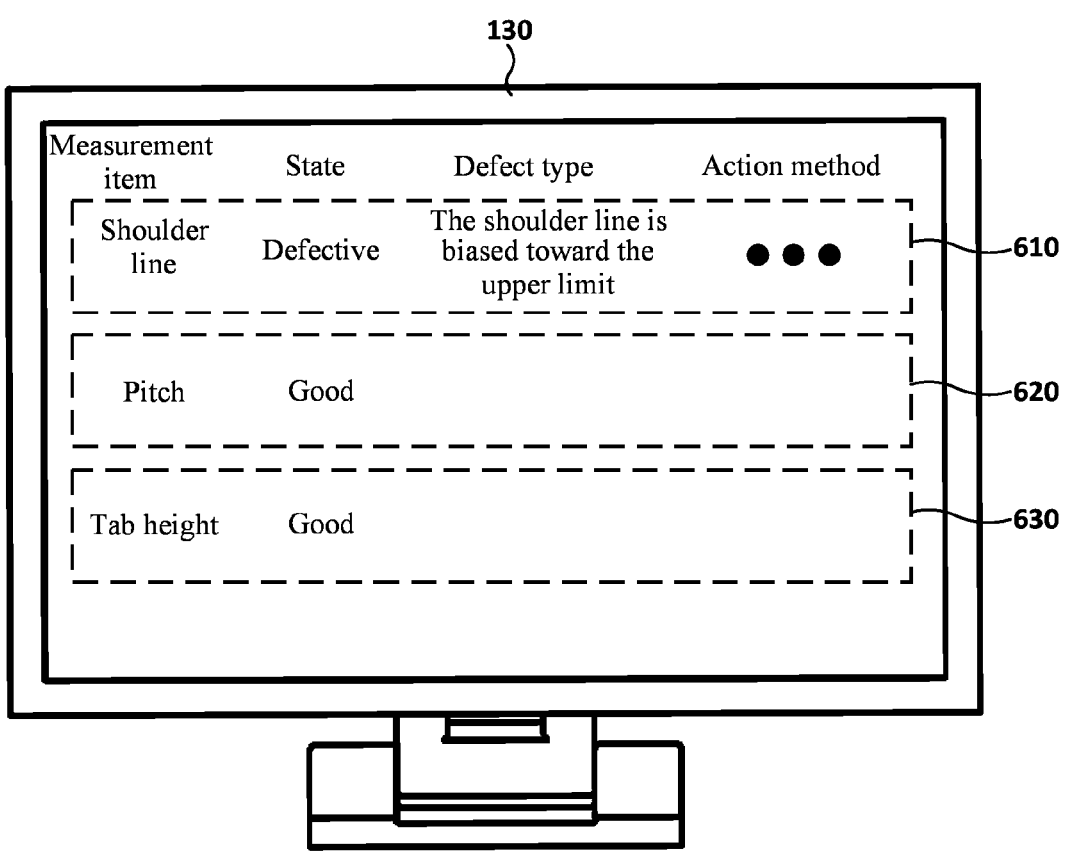
FIG. 6 illustrates an example of a display screen displayed or output on an apparatus operating unit according to yet another embodiment of the present disclosure.

FIG. 6 illustrates an example of a display screen displayed or output on an apparatus operating unit 130 according to yet another embodiment of the present disclosure. As shown in the figure, the apparatus operating unit 130 may display or output text, an image, or a video related to the guide information 610, 620, 630 including state information due to each measurement item, defect type, user condition information, user action information and laser setting information required to resolve the corresponding defect. FIG. 6 assumes that first guide information 610, second guide information 620, and third guide information 630 are displayed in specific areas on the display screen, but the present disclosure is not limited to the assumption: each text, image, or video may be displayed in any position on the display screen.

According to an embodiment, the guide information 610, 620, 630 may display the state of each measurement item as defective or normal and may include a defect type and a method for responding to the defect for the measurement item determined as defective. For example, the first guide information 610, as guide information for the shoulder line item, may include measures to be taken related to a defect in which the shoulder line is biased toward the upper limit. The second guide information 620 relates to a pitch item and may display that the pitch item is in the normal state: the third guide information 630 relates to a tab height item and may display that the tab height item is in the normal state. When each of the pitch item and the tab height item enters the defective state, the second to third guide information may include the defect type and measures to the related defects, respectively. The user may perform training to produce a material with quality lying within a normal range by checking a defect pattern and an action method corresponding to each defect pattern and manipulating a condition and/or a value of an adjustment parameter or manipulating a condition and/or a value of a laser parameter or adjusting setting values of the 3D model apparatus.

FIG. 6 assumes that the guide information 610, 620, 630 is displayed or output on the apparatus operating unit 130, but the present disclosure is not limited to the assumption: the guide information may be displayed on a separate display apparatus.

Figure 7:
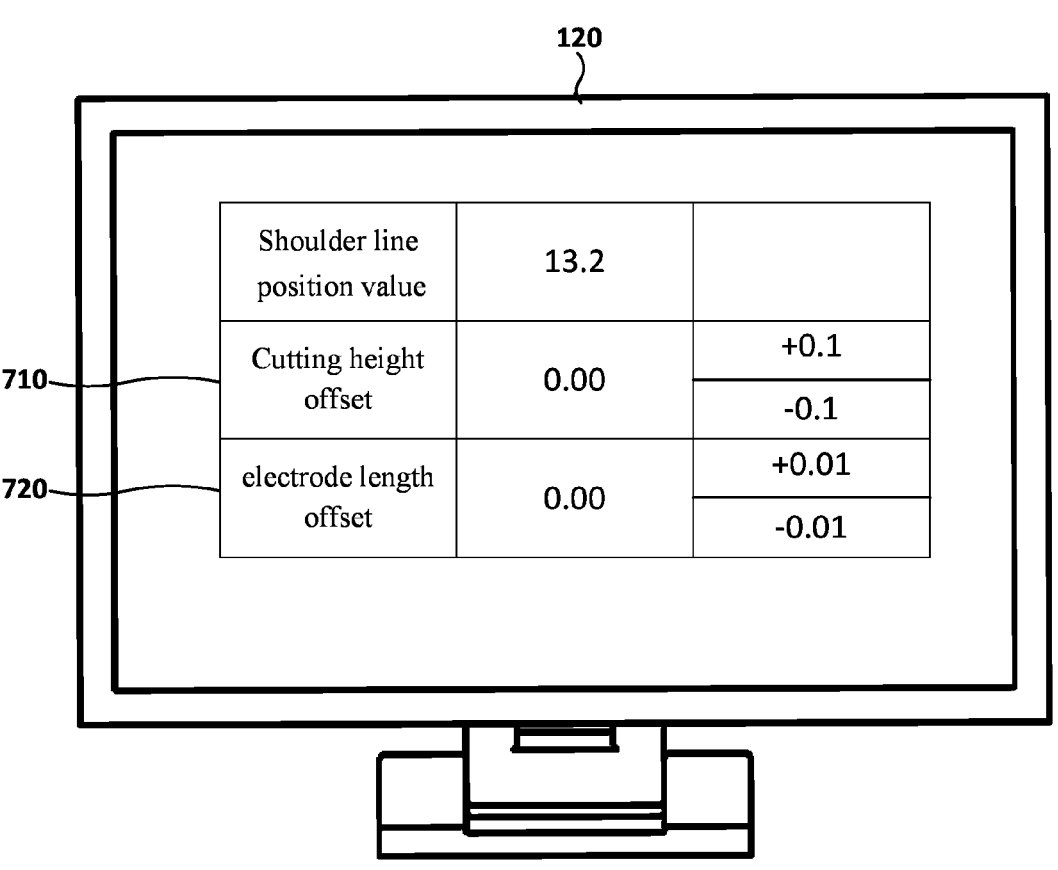
FIG. 7 illustrates an example of a display screen displayed or output on a facility operating unit related to a 3D laser notching machine according to an embodiment of the present disclosure.

FIG. 7 illustrates an example of a display screen displayed or output on a facility operating unit 120 related to a 3D laser notching machine according to an embodiment of the present disclosure, and FIG. 8 illustrates an example of a display screen displayed or output on a laser setting unit 150 related to a 3D laser notching machine according to an embodiment of the present disclosure.

According to an embodiment, the laser notching machine may refer to an apparatus for punching out a slitted electrode in a predetermined shape. In the notching process performed by the laser notching machine, it may be essential to perform punching with, for example, a regular and uniform shoulder line position, electrode length, pitch interval, and tab height to produce quality material. Here, the shoulder line position, the electrode length, the pitch interval and the tab height may be changed according to a setting value such as a cutting height offset, an electrode length offset, a pitch length offset and a tab height offset and/or a condition value. Among them, the cutting height offset and the electrode length offset may be set by adjusting the condition parameters through the facility operating unit 120 as illustrated in FIG. 7, and the tab height offset and the pitch length offset may be set by adjusting the laser parameters through the laser setting unit 150 as illustrated in FIG. 8.

According to an embodiment, quality information related to the quality of a material generated by the 3D laser notching machine may be displayed or output on the quality checking unit. For example, the simulation apparatus (100 in FIG. 1) may determine one or more quality parameters for determining the quality of a material produced by the 3D laser notching machine and, while the operation of the 3D laser notching machine is in progress, calculate a value corresponding to each of one or more quality parameters determined based on the operation of the 3D laser notching machine in progress. Then, the simulation apparatus may generate and output quality information related to the quality of the material produced by the 3D laser notching machine based on the values corresponding to each of the calculated one or more quality parameters. In the illustrated example, the quality checking unit may include quality information (or quality parameters) for checking the shoulder line position, electrode length, pitch interval, tab height and so on.

According to an embodiment, a plurality of adjustment parameters for determining the operation of the 3D laser notching machine may include a cutting height offset 710 and an electrode length offset 720, as illustrated in FIG. 7. Here, the cutting height offset 710 may be a parameter for adjusting the y-axis punching position, and the electrode length offset 720 may be a parameter for adjusting a length between top and bottom of a y-axis of the electrode. When the cutting height offset 710 is changed by the user, the value of the quality parameter related to the shoulder line position of a material (electrode tab) displayed on the quality checking unit may be changed or adjusted. Also, when the electrode length offset 720 is changed by the user, the value of the quality parameter related to the y-axis length of a material (electrode) displayed on the quality checking unit may be changed or adjusted.

According to an embodiment, a plurality of laser parameters for determining the operation of the 3D laser notching machine may include a tab height offset 810 and a pitch length offset 820, as illustrated in FIG. 8. Here, the tab height offset 810 may be a parameter for adjusting the height of the tab, and the pitch length offset 820 may be a parameter for adjusting the pitch interval. When the tab height offset 810 is changed by the user, the value of the quality parameter related to the height of the material (electrode tab) displayed on the quality checking unit may be changed or adjusted. In addition, when the pitch length offset 820 is changed by the user, the value of the quality parameter related to the pitch interval of the material (arbitrary two electrodes) displayed on the quality checking unit may be changed or adjusted.

According to an embodiment, the adjustment parameter of the 3D laser notching machine may include a vision position offset, and the vision position offset may be a parameter for adjusting the measurement position for each vision measurement item related to a punched-out electrode. The vision position offset may be adjusted through a vision program offset adjustment screen, and when the user changes the vision position offset of a specific measurement item, the value of the quality parameter related to the corresponding measurement item may be changed or adjusted.

FIG. 9 illustrates an example in which a shoulder line defect scenario has occurred in a quality checking unit 140 according to an embodiment of the present disclosure. As described above, the simulation apparatus (100 of FIG. 1) may determine one or more defect scenarios among a plurality of defect scenarios related to a malfunction of the 3D laser notching machine during the condition adjustment training to defect case training and, based on the determined one or more defect scenarios, may change at least one of the operation of the 3D laser notching machine or the quality information related to quality of the material. Here, a plurality of defect scenarios may include a shoulder line defect scenario. For example, the shoulder line defect scenario may refer to a scenario in which positions of the front and rear shoulder lines of electrodes deviate from the upper or lower limit of a predetermined specification to generate a defect material. FIG. 9 illustrates an example in which the front and rear shoulder lines are biased toward the upper limit of the specification. The quality checking unit 140 may include a vision graph 900, and when the shoulder line defect scenario occurs, the vision graph 900 may output or display the front and rear shoulder line positions measured at normal measurement positions by the vision equipment for the shoulder line position measurement.

According to an embodiment, when the determined one or more defect scenarios include the shoulder line defect scenario, as shown in FIG. 9, the simulation apparatus displays the front and rear shoulder line positions 910, 930 to be biased toward the upper limit of the specification in the vision graph 900 of the quality checking unit 140 (where a defect displayed being biased toward the lower limit may also occur) and displays defect items in at least a portion of the 3D laser notching machine included in the apparatus operating unit 130. During the condition adjustment training process, an action guide may be additionally displayed in at least a portion of the apparatus operating unit 130.

When the shoulder line defect scenario occurs, the user may correct the shoulder line position by adjusting the cutting height offset 710 of the facility operating unit 120 as shown in FIG. 7. When adjustment of a mechanical part is required, the shoulder line defect scenario may be dealt with by touching or dragging a specific area of the 3D laser notching machine displayed on the apparatus operating unit 130. In other words, the simulation apparatus may correct the shoulder line position of the material in response to receiving the user condition information corresponding to the cutting height offset from the user. Optionally or alternatively, the simulation apparatus may correct the shoulder line positions of electrodes changed in response to receiving the user action information touching or dragging a specific mechanical part to resolve the shoulder line defect from the user.

Then, the simulation apparatus may determine whether the shoulder line defect scenario has been resolved based on the corrected shoulder line position of the electrode. For example, when at least one of the user action information or the user condition information is generated based on a touch input or a drag input to a predetermined area in a predetermined order that may be used at the time of resolving the shoulder line defect scenario, or a predetermined offset setting value is input: then, the simulation apparatus may determine that the shoulder line defect scenario has been resolved. In other words, when the shoulder line position of the electrode is corrected based on at least one of the corresponding user action information or user condition information, the simulation apparatus may determine that the shoulder line defect scenario has been resolved. If it is determined that the defect scenario has been resolved, the front and rear shoulder lines may be moved and displayed at the center position 920, 940 between the upper and lower limits in the vision graph 900 displaying the quality information of electrodes.

FIG. 10 illustrates an example in which an electrode length defect scenario has occurred in a quality checking unit 140 according to an embodiment of the present disclosure. As described above, the simulation apparatus (100 of FIG. 1) may determine one or more defect scenarios among a plurality of defect scenarios related to a malfunction of the 3D laser notching machine during the condition adjustment training to defect case training and, based on the determined one or more defect scenarios, may change at least one of the operation of the 3D laser notching machine or the quality information related to quality of the material. Here, the plurality of defect scenarios may include an electrode length defect scenario. For example, the electrode length defect scenario may refer to a scenario in which the length between the top and bottom of the y-axis of the electrode deviates the upper or lower limit of a predetermined specification to generate a defect material. FIG. 10 illustrates an example in which the electrode length is biased toward the upper limit of the specification. The quality checking unit 140 may include a vision graph 1000, and when the electrode length defect scenario occurs, the vision graph 1000 may output or display the electrode length measured at normal measurement positions by the vision equipment for the electrode length measurement.

According to an embodiment, when the determined one or more defect scenarios include the electrode length defect scenario, as shown in FIG. 10, the simulation apparatus displays an electrode length 1010 to be biased toward the upper limit of the specification in the vision graph 1000 of the quality checking unit 140 (where a defect displayed being biased toward the lower limit may also occur) and displays defect items in at least a portion of the 3D laser notching machine included in the apparatus operating unit 130. During the condition adjustment training process, an action guide may be additionally displayed in at least a portion of the apparatus operating unit 130.

When the electrode length defect scenario occurs, the user may correct the electrode length by adjusting the electrode length offset 720 of the facility operating unit 120 as shown in FIG. 7. When adjustment of a mechanical part is required, the electrode length defect scenario may be dealt with by touching or dragging a specific area of the 3D laser notching machine displayed on the apparatus operating unit 130. In other words, the simulation apparatus may correct the electrode length of the material in response to receiving the user condition information corresponding to the electrode length offset from the user. Optionally or alternatively, the simulation apparatus may correct the electrode length of electrodes changed in response to receiving the user action information touching or dragging a specific mechanical part to resolve the electrode length defect from the user.

Then, the simulation apparatus may determine whether the electrode length defect scenario has been resolved based on the corrected electrode length of the electrode. For example, when at least one of the user action information or the user condition information is generated based on a touch input or a drag input to a predetermined area in a predetermined order that may be used at the time of resolving the electrode length defect scenario, or a predetermined offset setting value is input: then, the simulation apparatus may determine that the electrode length defect scenario has been resolved. In other words, when the electrode length of the electrode is corrected based on at least one of the corresponding user action information or user condition information, the simulation apparatus may determine that the electrode length defect scenario has been resolved. If it is determined that the defect scenario has been resolved, the electrode length may be moved and displayed at a center position 1020 between the upper and lower limits in the vision graph 1000 displaying the quality information of electrodes.

FIG. 11 illustrates an example in which a tab height defect scenario has occurred in a quality checking unit 140 according to an embodiment of the present disclosure. As described above, the simulation apparatus (100 of FIG. 1) may determine one or more defect scenarios among a plurality of defect scenarios related to a malfunction of the 3D laser notching machine during the condition adjustment training to defect case training and, based on the determined one or more defect scenarios, may change at least one of the operation of the 3D laser notching machine or the quality information related to quality of the material. Here, the plurality of defect scenarios may include a tab height defect scenario. For example, the tab height defect scenario may refer to a scenario in which the height of the electrode tab deviates the upper or lower limit of a predetermined specification to generate a defect material. FIG. 11 illustrates an example in which the tab height is biased toward the lower limit of the specification. The quality checking unit 140 may include a vision graph 1100, and when the tab height defect scenario occurs, the vision graph 1100 may output or display the tab height measured at normal measurement positions by the vision equipment for the tab height measurement.

According to an embodiment, when the determined one or more defect scenarios include the tab height defect scenario, as shown in FIG. 11, the simulation apparatus displays a tab height 1110 to be biased toward the lower limit of the specification in the vision graph 1100 of the quality checking unit 140 (where a defect displayed being biased toward the upper limit may also occur) and displays defect items in at least a portion of the 3D laser notching machine included in the apparatus operating unit 130. During the condition adjustment training process, an action guide may be additionally displayed in at least a portion of the apparatus operating unit 130.

When the tab height defect scenario occurs, the user may correct the tab height by adjusting the tab height offset 810 of the laser setting unit 150 as shown in FIG. 8. When adjustment of a mechanical part is required, the tab height defect scenario may be dealt with by touching or dragging a specific area of the 3D laser notching machine displayed on the apparatus operating unit 130. In other words, the simulation apparatus may correct the tab height of the material in response to receiving the laser setting information corresponding to the tab height offset from the user. Optionally or alternatively, the simulation apparatus may correct the tab height changed in response to receiving the user action information touching or dragging a specific mechanical part to resolve the tab height defect from the user.

Then, the simulation apparatus may determine whether the tab height defect scenario has been resolved based on the corrected tab height. For example, suppose that at least one of the user action information or the laser setting information is generated based on a touch input or a drag input to a predetermined area in a predetermined order that may be used at the time of resolving the tab height defect scenario, or a predetermined offset setting value is input: then, the simulation apparatus may determine that the tab height defect scenario has been resolved. In other words, when the tab height is corrected based on at least one of the corresponding user action information or laser setting information, the simulation apparatus may determine that the tab height defect scenario has been resolved. If it is determined that the defect scenario has been resolved, the tab height may be moved and displayed at a center position 1120 between the upper and lower limits in the vision graph 1100 displaying the quality information of electrodes.

FIG. 12 illustrates an example in which a pitch defect scenario has occurred in a quality checking unit 140 according to an embodiment of the present disclosure. As described above, the simulation apparatus (100 of FIG. 1) may determine one or more defect scenarios among a plurality of defect scenarios related to a malfunction of the 3D laser notching machine during the condition adjustment training to defect case training and, based on the determined one or more defect scenarios, may change at least one of the operation of the 3D laser notching machine or the quality information related to quality of the material. Here, the plurality of defect scenarios may include a pitch defect scenario. For example, the pitch defect scenario may refer to a scenario in which the pitch interval between arbitrary two electrodes deviates from the upper or lower limit of a predetermined specification to generate a defect material. FIG. 12 illustrates an example in which the pitch interval is biased toward the lower limit of the specification. The quality checking unit 140 may include a vision graph 1200, and when the pitch defect scenario occurs, the vision graph 1200 may output or display the pitch interval measured at normal measurement positions by the vision equipment for the pitch interval measurement.

According to an embodiment, when the determined one or more defect scenarios include the pitch defect scenario, as shown in FIG. 12, the simulation apparatus displays the pitch interval 1210 to be biased toward the lower limit of the specification in the quality checking unit 140 (where a defect displayed being biased toward the upper limit may also occur) and displays defect items in at least a portion of the 3D laser notching machine included in the apparatus operating unit 130. During the condition adjustment training process, an action guide may be additionally displayed in at least a portion of the apparatus operating unit 130.

When the pitch defect scenario occurs, the user may correct the pitch interval by adjusting the pitch length offset 820 of the laser setting unit 150 as shown in FIG. 8. When adjustment of a mechanical part is required, the pitch defect scenario may be dealt with by touching or dragging a specific area of the 3D laser notching machine displayed on the apparatus operating unit 130. In other words, the simulation apparatus may correct the pitch interval of the material in response to receiving the laser setting information corresponding to the pitch length offset from the user. Optionally or alternatively, the simulation apparatus may correct the pitch interval of electrodes changed in response to receiving the user action information touching or dragging a specific mechanical part to resolve the pitch defect from the user.

Then, the simulation apparatus may determine whether the pitch defect scenario has been resolved based on the corrected pitch interval of the electrode. For example, suppose that at least one of the user action information or the laser setting information is generated based on a touch input or a drag input to a predetermined area in a predetermined order that may be used at the time of resolving the pitch defect scenario, or a predetermined offset setting value is input: then, the simulation apparatus may determine that the pitch defect scenario has been resolved. In other words, when the pitch interval of the electrode is corrected based on at least one of the corresponding user action information or laser setting information, the simulation apparatus may determine that the pitch defect scenario has been resolved. If it is determined that the defect scenario has been resolved, the pitch interval may be moved and displayed at the center position 1220 between the upper and lower limits in the vision graph 1200 displaying the quality information of electrodes.

The simulation apparatus (100 of FIG. 1) may determine one or more defect scenarios among a plurality of defect scenarios related to a malfunction of the 3D laser notching machine during the condition adjustment training to defect case training and, based on the determined one or more defect scenarios, may change at least one of the operation of the 3D laser notching machine or the quality information related to quality of the material. Here, the plurality of defect scenarios may include a vision position defect scenario.

The vision graph 900 of FIG. 9 may be a graph for showing the front and rear shoulder line positions measured by vision equipment for the shoulder line position measurement after the position of the vision equipment is changed to a predetermined specific abnormal measurement position, the vision graph 1000 of FIG. 10 may be a graph for showing the electrode length measured by vision equipment for the electrode length measurement after the position of the vision equipment is changed to a predetermined specific abnormal measurement position, the vision graph 1100 of FIG. 11 may be a graph for showing the tab height measured by vision equipment for the tab height measurement after the position of the vision equipment is changed to a predetermined specific abnormal measurement position, and the vision graph 1200 of FIG. 12 may be a graph for showing the pitch interval measured by vision equipment for the pitch interval measurement after the position of the vision equipment is changed to a predetermined specific abnormal measurement position.

Suppose that the measurement position of the vision equipment for each measurement item (e.g., the front and rear shoulder line position, the electrode length, the tab height, and the pitch interval) is changed to an abnormal position: then, even if the punching-out state of the actual electrodes is normal, the quality information obtained through the vision equipment may be displayed or output as a punching state defect such as the shoulder line position defect, the electrode length defect, the tab height defect or the pitch interval defect, as shown in the vision graphs 900, 1000, 1100, 1200 of FIGS. 9 to 12.

In this case, even if the user adjusts the cutting height offset, the electrode length offset, the tab height offset, or the pitch length offset as described above, since the measurement position of the vision equipment for each measurement item is abnormal, the quality information of the material displayed or output in the vision graph may not be corrected.

According to an embodiment, when the determined one or more defect scenarios include the shoulder line measurement vision position defect scenario, as shown in FIG. 9, the simulation apparatus may display the front and rear shoulder line positions 910, 930 to be biased toward the upper limit of the specification in the quality checking unit 140 (where a defect displayed being biased toward the lower limit may also occur) and display defect items in at least a portion of the 3D laser notching machine included in the apparatus operating unit 130. In addition, when the determined one or more defect scenarios include the electrode length measurement vision position defect scenario, as shown in FIG. 10, the simulation apparatus may display the electrode length 1010 to be biased toward the upper limit of the specification in the quality checking unit 140 (where a defect displayed being biased toward the lower limit may also occur) and display defect items in at least a portion of the 3D laser notching machine included in the apparatus operating unit 130. In addition, when the determined one or more defect scenarios include the tab height measurement vision position defect scenario, as shown in FIG. 11, the simulation apparatus may display the tab height 1110 to be biased toward the lower limit of the specification in the quality checking unit 140 (where a defect displayed being biased toward the upper limit may also occur) and display defect items in at least a portion of the 3D laser notching machine included in the apparatus operating unit 130. In addition, when the determined one or more defect scenarios include the pitch measurement vision position defect scenario, as shown in FIG. 12, the simulation apparatus displays the pitch interval 1210 to be biased toward the lower limit of the specification in the quality checking unit 140 (where a defect displayed being biased toward the upper limit may also occur) and displays defect items in at least a portion of the 3D laser notching machine included in the apparatus operating unit 130.

When the vision position defect scenario for each measurement item as described above occurs, the user may correct the vision position by adjusting the vision position offset value in a vision program for each measurement item. When adjustment of the mechanical part is necessary, the vision position defect scenario may be dealt with by touching or dragging a specific area of the 3D laser notching machine displayed on the apparatus operating unit 130. In other words, the simulation apparatus may correct the vision position for measuring the corresponding measurement item in response to receiving the user condition information corresponding to the vision position offset from the user. Optionally or alternatively, the simulation apparatus may correct the vision position changed in response to receiving the user action information touching or dragging a specific area to resolve the vision position defect from the user. In the condition adjustment training process, an action guide may be additionally displayed on at least a part of the apparatus operating unit 130.

Then, the simulation apparatus may determine whether the vision position defect scenario has been resolved based on the corrected vision position. For example, suppose that at least one of the user action information or the user condition information is generated based on a touch input or a drag input to a predetermined area in a predetermined order that may be used at the time of resolving the vision position defect scenario, or a predetermined vision position offset setting value is input: then, the simulation apparatus may determine that the vision position defect scenario has been resolved. In other words, when the vision position is corrected based on at least one of the corresponding user action information or user condition information, the simulation apparatus may determine that the vision position defect scenario has been resolved. If it is determined that the scenario has been resolved, the front and rear shoulder lines may be moved and displayed at the center position 920, 940 between the upper and lower limits, the electrode length may be moved and displayed at the center position 1020 between the upper and lower limits, the tab height may be moved and displayed at the center position 1120 between the upper and lower limits, or the pitch interval may be moved and displayed at the center position 1220 between the upper and lower limits in the vision graph 900, 1000, 1100, 1200 displaying the quality information of electrodes.

FIGS. 9 to 12 are drawings that describe a shoulder line defect scenario, an electrode length defect scenario, a tab height defect scenario, a pitch defect scenario, and a vision position defect scenario; however, a plurality of defect scenarios may further include other defect scenarios that may occur in a laser notching machine.

FIG. 13 illustrates an example in which a defect scenario 1322 is generated according to an embodiment of the present disclosure. As shown in the figure, the simulation apparatus 100 may communicate with an external device (e.g., secondary battery production equipment) 1310 and a defect scenario DB 1320 and exchange data and/or information required for generating the defect scenario 1322.

According to an embodiment, when a malfunction occurs in an external device 1310, the simulation apparatus 100 may receive or obtain error information 1312 related to the malfunction from the external device 1310. Here, the error information 1312 may include operation information of the external device 1310 when the malfunction occurs and the quality change level of a material generated by the external device 1310. In this case, the simulation apparatus 100 may determine condition values and setting values of a 3D model apparatus (e.g., a 3D laser notching machine) and/or each quality parameter value of the quality information and generate a defect scenario 1322 having the condition values and the setting values of the determined 3D model apparatus and/or the quality parameter values to respond to the corresponding error information 1312. The generated defect scenario 1322 may be stored and managed in the defect scenario DB 1320. For example, the simulation apparatus 100 may determine condition values and setting values of a 3D model apparatus and/or each quality parameter value of the quality information and generate a defect scenario 1322 to respond to the error information 1312 by using an arbitrary algorithm for generating a defect scenario 1322 and/or a trained machine learning model.

According to an embodiment, the processor may convert the operation information of the external device 1310 into a first set of parameters related to the operation of the 3D model apparatus and convert the quality change level of a material generated by the external device 1310 into a second set of parameters related to the quality information related to the quality of a material generated by the 3D model apparatus. Then, the processor may determine the category of a malfunction occurring in the external device 1310 using the converted first set of parameters and second set of parameters and generate a defect scenario based on the determined category, the first set of parameters, and the second set of parameters.

FIG. 13 assumes that a defect scenario is generated when a malfunction occurs in the external apparatus 1310, but the present disclosure is not limited to the assumption; for example, a defect scenario may be predetermined by an arbitrary user. In another example, a defect scenario may be generated by randomly determining setting values, condition values, and quality information related to the 3D model apparatus within a predetermined, abnormal range. Based on the configuration above, a user may be trained using a defect scenario generated based on a malfunction occurring in actual work environments, thereby effectively improving the ability to respond to defects.

FIG. 14 illustrates an example in which operational capability information 1430 and a test result 1440 are generated according to an embodiment of the present disclosure. As described above, when a defect scenario occurs, the simulation apparatus 100 may receive user condition information 1410 and user action information 1420 from a user and, based on the received user condition information 1410 and user action information 1420, determine whether the defect scenario has been resolved.

According to an embodiment, when it is determined that a defect scenario has been resolved, the simulation apparatus 100 may calculate a work speed, time taken for responding to a defect, the number of NGs, degree of proximity to a target value, and a loss value of the defect scenario while the defect scenario is in progress and, based on the calculated progress time and loss value, generate the operational capability information 1430 for the 3D model apparatus of a user account. In this case, a test result 1440 may be output together with the operational capability information 1430. For example, a user related to the corresponding user account may take a test for an arbitrary defect scenario, and when all defect scenarios related to a specific 3D model apparatus are resolved according to a predetermined criterion, the simulation apparatus 100 may determine that the corresponding user has passed a simulation test for the specific 3D model apparatus.

FIG. 15 illustrates an example of a simulation method S1500 for secondary battery production according to an embodiment of the present disclosure. The simulation method S1500 for secondary battery production may be performed by a processor (e.g., at least one processor of a simulation apparatus). As shown in the figure, the simulation method S1500 for secondary battery production may be initiated as the processor executes an apparatus operating unit including a 3D model apparatus related to secondary battery production, a facility operating unit including a plurality of adjustment parameters for determining the operation of the 3D model apparatus, and a quality checking unit including quality information related to the quality of a material generated by the 3D model apparatus, S1510.

The processor may obtain at least one of first user action information obtained through the apparatus operating unit or first user condition information obtained through the facility operating unit, S1520. Here, the first user condition information may include information related to a value corresponding to at least one adjustment parameter among a plurality of adjustment parameters.

The processor may determine the operation of the 3D model apparatus based on at least one of the first user action information or the first user condition information obtained, S1530. Also, the processor may execute the operation of the 3D model apparatus included in the apparatus operating unit based on the determined operation, S1540. When receiving the first user action information, the processor may determine whether the received first user action information corresponds to a predetermined operating condition of the 3D model apparatus and approve the operation of the 3D model apparatus when it is determined that the first user action information corresponds to the predetermined operating condition of the 3D model apparatus.

According to an embodiment, the processor may determine one or more quality parameters for determining the quality of a material generated by the 3D model apparatus and, while the operation of the 3D model apparatus is executed, calculate a value corresponding to each of the determined one or more quality parameters based on the operation of the 3D model apparatus in execution. Also, the processor may generate quality information related to the quality of a material generated by the 3D model apparatus based on the calculated value corresponding to each of the one or more quality parameters.

According to an embodiment, the processor may determine one or more defect scenarios among a plurality of defect scenarios related to a malfunction of the 3D model apparatus and change at least one of the operation of the 3D model apparatus or the quality information related to the quality of a material based on the determined one or more defect scenarios. Then, the processor may receive at least one of second user action information or second user condition information for resolving the determined one or more defect scenarios and, based on at least one of the received second user action information or second user condition information, correct the changed operation of the 3D model apparatus. Also, while the corrected operation of the 3D model apparatus is executed, the processor may calculate a value corresponding to each of a plurality of quality parameters related to the quality of a material generated by the 3D model apparatus based on the operation of the 3D model apparatus in execution. In this case, the processor may correct the quality information related to the quality of a material generated by the corrected 3D model apparatus based on the calculated value corresponding to each of the plurality of quality parameters and, by using the corrected quality information, determine whether one or more defect scenarios have been resolved.

FIG. 16 illustrates an example of a simulation method S1600 of a laser notching machine for secondary battery production according to an embodiment of the present disclosure.

The simulation method S1600 of a laser notching machine for secondary battery production may be performed by a processor (e.g., at least one processor of a simulation apparatus). As shown in the figure, the simulation method S1600 of a laser notching machine for secondary battery production may be initiated as the processor executes the apparatus operating unit including a 3D laser notching machine related to the production of secondary batteries, the facility operating unit including a plurality of adjustment parameters for determining the operation of the 3D laser notching machine, the quality checking unit including the quality information related to the quality of a material generated by the 3D laser notching machine, and the laser setting unit including a plurality of laser parameters for determining the operation of the 3D laser notching machine S1610.

The processor may obtain at least one of first user action information obtained through the apparatus operating unit, first user condition information obtained through the facility operating unit, or first laser setting information obtained through the laser setting unit S1620. Also, the processor may determine the operation of the 3D laser notching machine based on at least one of the obtained first user behavior information, first user condition information, or first laser setting information S1630. Also, the processor may execute the operation of punching out the electrode related to the 3D laser notching machine based on the determined operation S1640. Here, the operation of the 3D laser notching machine may include a notching facility operation training operation and a material replacement training operation, where the notching facility operation training operation includes checking an operation preparation state, operating a notching facility, and checking a punching-out state; and the material replacement training operation may include checking a supply unit status, removing a residual amount of electrodes, connecting electrodes, and collecting samples.

Also, the processor may determine one or more quality parameters for determining the quality of a material generated by the 3D laser notching machine and, while the operation of the 3D laser notching machine is executed, calculate a value corresponding to each of the determined one or more quality parameters based on the operation of the 3D laser notching machine in execution. Also, the processor may generate quality information related to the quality of a material generated by the 3D laser notching machine based on the calculated value corresponding to each of the one or more quality parameters.

According to an embodiment, the processor may determine one or more defect scenarios among a plurality of defect scenarios related to a malfunction of the 3D laser notching machine and change at least one of the operation of 3D laser notching machine or the quality information related to the quality of a material based on the determined one or more defect scenarios. For example, a plurality of defect scenarios may include a shoulder line defect scenario, an electrode length defect scenario, a tab height defect scenario, a pitch defect scenario, and a vision position defect scenario. In this case, each defect scenario may be resolved by arbitrary user condition information, user action information and/or laser setting information input from a user.

FIG. 17 illustrates an example of a method for calculating a test result S1700 according to an embodiment of the present disclosure. The method for calculating a test result S1700 may be performed by a processor (e.g., at least one processor of a simulation apparatus). As shown in the figure, the method for calculating a test result S1700 may be initiated as the processor receives at least one of second user action information, second user condition information, or second laser setting information for resolving determined one or more defect scenarios S1710.

As described above, the processor may correct the changed operation of the 3D model apparatus based on at least one of the received second user action information, second user condition information, or second laser setting information S1720. Also, while the corrected operation of the 3D model apparatus is executed, the processor may calculate a value corresponding to each of a plurality of quality parameters related to the quality of a material generated by the 3D model apparatus based on the operation of the 3D model apparatus in execution S1730. In this case, the processor may correct the quality information related to the quality of a material generated by the corrected 3D model apparatus based on the calculated value corresponding to each of the plurality of quality parameters S1740.

Then, the processor may determine whether one or more defect scenarios have been resolved using the corrected quality information and/or the setting values and condition values of the 3D model apparatus S1750. When it is determined that the defect scenario has not been resolved, the processor may again generate or obtain the second user action information, the second user condition information and the second laser setting information using the information input by the user.

When it is determined that one or more defect scenarios have been resolved, the processor may calculate a progress time and a loss value of one or more defect scenarios while one or more defect scenarios are in progress S1760. Also, based on the calculated progress time and loss value, the processor may generate operational capability information of the user account for the 3D model apparatus S1770. Here, the operational capability information may include, but is not limited to, a progress speed and accuracy calculated using the time taken for responding to a defect, the number of NGs, degree of proximity to a target value, and a loss value and may further include the user's test score and whether the user has passed the test. In this case, one user account may be assigned to each user performing secondary battery production: the operational capability information generated based on the user's work speed for handling a defect scenario, time taken for responding to a defect, the number of NGs, degree of proximity to a target value, and a loss may be stored or managed in conjunction with the user account.

FIG. 18 illustrates an example of a method for generating a defect scenario S1800 according to an embodiment of the present disclosure. The method for generating a defect scenario S1800 may be performed by a processor (e.g., at least one processor of a simulation apparatus). As shown in the figure, the method for generating a defect scenario S1800 may be initiated as the processor obtains error information related to a malfunction when the malfunction occurs in an external apparatus related to the 3D model apparatus S1810.

The processor may generate a defect scenario related to a malfunction of the 3D model apparatus based on the obtained error information S1820. Here, the error information may include each adjustment parameter value and setting values of actual secondary battery production equipment related to the 3D model apparatus, obtained when the corresponding production equipment malfunctions. For example, when the quality of a material generated by secondary battery production equipment gets out of a predetermined normal range, it may be determined that a malfunction has occurred; when it is determined that a malfunction has occurred, the processor may obtain error information related to the malfunction and generate a defect scenario related to the malfunction of the 3D model apparatus based on the obtained error information.

FIG. 19 illustrates an exemplary computing device 1900 for performing the method and/or embodiments. According to an embodiment, the computing device 1900 may be implemented using hardware and/or software configured to interact with a user. Here, the computing device 1900 may include the simulation apparatus (100 of FIG. 1). For example, the computing device 1900 may be configured to support virtual reality (VR), augmented reality (AR), or mixed reality (MR) environments but is not limited thereto. The computing device 1900 may include a laptop computer, a desktop computer, a workstation, a personal digital assistant, a server, a blade server, and a mainframe computer, which is not limited thereto. The constituting elements of the computing device 1900 and connection relationships and functions of the constituting elements are intended to be illustrative and not intended to limit the implementations of the present disclosure described and/or claimed herein.

The computing device 1900 includes a processor 1910, a memory 1920, a storage device 1930, a communication device 1940, a high-speed interface 1950 connected to the memory 1920 and a high-speed expansion port, and a low-speed interface 1960 connected to a low-speed bus and a low-speed storage device. Each of the constituting elements 1910, 1920, 1930, 1940, 1950, 1960 may be interconnected using a variety of buses, mounted on the same main board, or mounted and connected in other suitable ways. The processor 1910 may be configured to process instructions of a computer program by performing basic arithmetic, logic, and input/output operations. For example, the processor 1910 may process instructions stored in the memory 1920 and the storage device 1930 and/or instructions executed within the computing device 1900 and display graphic information on an external input/output device 1970 such as a display device combined with the high-speed interface 1950.

The communication device 1940 may provide a configuration or a function for the input/output device 1970 and the computing device 1900 to communicate with each other through a network and provide a configuration or a function to support the input/output device 1970 and/or the computing device 1900 to communicate with another external apparatus. For example, a request or data generated by the processor of the external apparatus according to an arbitrary program code may be transmitted to the computing device 1900 through a network under the control of the communication device 1940. Conversely, a control signal or a command provided under the control of the processor 1910 of the computing device 1900 may be transmitted to another external device through the communication device 1940 and a network.

FIG. 19 assumes that the computing device 1900 includes one processor 1910 and one memory 1920, but the present disclosure is not limited to the assumption: the computing device 1900 may be implemented using a plurality of memories, a plurality of processors, and/or a plurality of buses. Also, although FIG. 19 assumes that one computing device 1900 is employed, the present disclosure is not limited to the assumption, and a plurality of computing devices may interact with each other and perform operations required to execute the method described above.

The memory 1920 may store information in the computing device 1900. According to an embodiment, the memory 1920 may include a volatile memory unit or a plurality of memory units. Additionally or alternatively, the memory 1920 may be composed of a non-volatile memory unit or a plurality of memory units. Also, the memory 1920 may be implemented using a different type of computer-readable medium, such as a magnetic disc or an optical disc. Also, an operating system and at least one program code and/or instruction may be stored in the memory 1920.

The storage device 1930 may be one or more mass storage devices for storing data for the computing device 1900. For example, the storage device 1930 may be configured to include a hard disc: a magnetic disc such as a portable disc; an optical disc; a semiconductor memory device such as an erasable programmable read-only memory (EPROM), an electrically erasable PROM (EEPROM), and a flash memory; and a computer-readable medium including a CD-ROM or DVD-ROM disc: or the storage device 1930 may be configured to include the computer-readable medium. Also, the computer program may be implemented tangibly in the computer-readable medium.

The high-speed interface 1950 and the low-speed interface 1960 may be used for interaction with the input/output device 1970. For example, an input device may include a camera including an audio sensor and/or an image sensor, a keyboard, a microphone, and a mouse: an output device may include a display, a speaker, and a haptic feedback device. In another example, the high-speed interface 1950 and the low-speed interface 1960 may be used for interfacing with a device in which a configuration or function for performing input and output operations is integrated into one entity, such as a touch screen.

According to an embodiment, the high-speed interface 1950 manages bandwidth-intensive operations for the computing device 1900, while the low-speed interface 1960 manages less bandwidth-intensive operations than the high-speed interface 1950, where the above functional assignment has been made merely for an illustrative purpose. According to an embodiment, the high-speed interface 1950 may be coupled to high-speed expansion ports capable of accommodating the memory 1920, the input/output device, and various expansion cards (not shown). Also, the low-speed interface 1960 may be coupled to the storage device 1930 and low-speed expansion ports. Additionally, the low-speed expansion port, which may include various communication ports (e.g., USB, Bluetooth, Ethernet, and wireless Ethernet), may be coupled to one or more input/output devices 1970, such as a keyboard, a pointing device, and a scanner, or a networking device, such as a router or a switch, through a network adaptor.

The computing device 1900 may be implemented in many different forms. For example, the computing device 1900 may be implemented as a standard server or a group of standard servers. Additionally or alternatively, the computing device 1900 may be implemented as part of a rack server system or may be implemented as a personal computer, such as a laptop computer. In this case, constituting elements from the computing device 1900 may be combined with other constituting elements of an arbitrary mobile device (not shown). The computing device 1900 may include one or more other computing devices or may be configured to communicate with one or more computing devices.

FIG. 19 assumes that the input/output device 1970 is not included in the computing device 1900, but the present disclosure is not limited to the assumption: the input/output device 1970 may be configured to be integrated into the computing device 1900 to form a single device. Also, FIG. 19 illustrates that the high-speed interface 1950 and/or the low-speed interface 1960 are illustrated as being configured separately from the processor 1910: however, the present disclosure is not limited thereto, and the high-speed interface 1950 and/or the low-speed interface 1960 may be configured to be included in the processor 1910.

The method and/or various embodiments described above may be implemented in digital electronic circuitry, computer hardware, firmware, software, and/or a combination thereof. Various embodiments of the present disclosure may be executed by a data processing device, for example, one or more programmable processors and/or one or more computing devices: or implemented as a computer-readable medium and/or a computer program stored on a computer-readable medium. The computer program may be written in any form of programming language including a compiled language or an interpreted language and may be distributed in any form such as a stand-alone program, a module, or a subroutine. The computer program may be distributed via a plurality of computing devices connected through one computing device and the same network and/or a plurality of distributed computing devices connected through a plurality of different networks.

The method and/or various embodiments described above may be performed by one or more processors configured to execute one or more computer programs that process, store, and/or manage arbitrary functions by operating based on input data or generating output data. For example, the method and/or various embodiments of the present disclosure may be performed by a special-purpose logic circuit such as a Field Programmable Gate Array (FPGA) or an Application Specific Integrated Circuit (ASIC): an apparatus and/or a system for performing the method and/or various embodiments of the present disclosure may be implemented as a special-purpose logic circuit such as an FPGA or an ASIC.

The one or more processors executing the computer program may include a general-purpose or special-purpose microprocessor and/or one or more processors of an arbitrary type of digital computing device. The processor may receive instructions and/or data from each of the read-only memory and the random-access memory or may receive instructions and/or data from the read-only memory and the random-access memory. In the present disclosure, the constituting elements of a computing device performing the method and/or embodiments may include one or more processors for executing instructions; and one or more memories for storing instructions and/or data.

According to an embodiment, the computing device may send and receive data to and from one or more mass storage devices for storing data. For example, the computing device may receive data from a magnetic or optical disc and transmit data to the magnetic or optical disc. A computer-readable medium suitable for storing instructions and/or data related to a computer program may include any form of non-volatile memory including a semiconductor memory device such as an Erasable Programmable Read-Only Memory (EPROM), an Electrically Erasable PROM (EE-PROM), and a flash memory device; however, the present disclosure is not limited thereto. For example, a computer-readable medium may include a magnetic disc such as an internal hard disc or a removable disc, a photomagnetic disk, a CD-ROM disc, and a DVD-ROM disc.

To provide interaction with a user, the computing device may include a display device (e.g., a cathode ray tube (CRT) or a liquid crystal display (LCD)) for providing or displaying information to the user and a pointing device (e.g., a keyboard, a mouse, or a trackball) through which the user may provide input and/or commands to the computing device by the user: however, the present disclosure is not limited to the specific example above. In other words, the computing device may further include any other kind of device for providing interaction with the user. For example, the computing device may provide any form of sensory feedback to the user for interaction with the user, including visual feedback, auditory feedback, and/or tactile feedback. In response to the feedback, the user may provide input to the computing device through various gestures including a visual expression, voice, and motion.

In the present disclosure, various embodiments may be implemented in a computing device that includes a back-end component (e.g., a data server), a middleware component (e.g., an application server), and/or a front-end component. In this case, the constituting elements may be interconnected by any form or any medium of digital data communication, such as a communication network. According to an embodiment, the communication network includes a wired network such as Ethernet, a wired home network (Power Line Communication), a telephone line communication device, and RS-serial communication: a wireless network such as a mobile communication network, a wireless LAN (WLAN), Wi-Fi, and Bluetooth; or a combination of the wired and wireless networks. For example, the communication network may include a local area network (LAN) and a wide area network (WAN).

A computing device based on the illustrative embodiments described herein may be implemented using hardware and/or software configured to interact with a user, including a user device, a user interface (UI) device, a user terminal, or a client device. For example, the computing device may include a portable computing device such as a laptop computer. Additionally or alternatively, the computing device may include a Personal Digital Assistants (PDA), a tablet PC, a game console, a wearable device, an Internet of Things (IoT) device, a virtual reality (VR) device, and an augmented reality (AR) device but is not limited thereto. The computing device may further include other types of devices configured to interact with the user. Also, the computing device may include a portable communication device (e.g., a mobile phone, a smartphone, or a wireless cellular phone) suitable for wireless communication over a network, such as a mobile communication network. The computing device may be configured to communicate wirelessly with a network server using wireless communication technologies and/or protocols such as Radio Frequency (RF), Microwave Frequency (MWF), and/or Infrared Ray Frequency (IRF).

Various embodiments of the present disclosure, including specific structural and functional details, are illustrative in nature. Accordingly, the embodiments of the present disclosure are not limited to those described above and may be implemented in various other forms. Also, the terms used in the present disclosure are intended for describing part of embodiments and should not be construed as limiting the embodiments. For example, singular words and the descriptions above may be construed to include plural forms unless the context dictates otherwise.

Unless defined otherwise, terms used in the present disclosure, including technical or scientific terms, may convey the same meaning understood generally by those skilled in the art to which the present disclosure belongs. Among the terms used in the present disclosure, commonly used terms, such as those defined in ordinary dictionaries, should be interpreted to convey the same meaning in the context of related technology.

The present disclosure has been described with reference to particular embodiments; however, various modifications and changes may be made without departing from the technical scope of the present disclosure that may be understood by those skilled in the art to which the present disclosure belongs. Also, it should be understood that the modifications and changes fall within the technical scope of the appended claims.

What is claimed is:

1. A simulation apparatus of a laser notching machine for secondary battery production, the simulation apparatus comprising:

a memory configured to store at least one instruction; and at least one processor configured to execute the at least one instruction stored in the memory, wherein the at least one instruction includes instructions for:

executing an apparatus operating unit including a 3D laser notching machine related to the secondary battery production, a facility operating unit including a plurality of adjustment parameters for determining the operation of the 3D laser notching machine, a quality checking unit including quality information related to quality of a material produced by the 3D laser notching machine, and a laser setting unit including a plurality of laser parameters for determining operation of the 3D laser notching machine;

obtaining at least one of first user action information obtained through the apparatus operating unit, first user condition information obtained through the facility operating unit, or first laser setting information obtained through the laser setting unit;

determining the operation of the 3D laser notching machine based on at least one of the first user action information, the first user condition information or the first laser setting information obtained; and punching out electrodes related to the 3D laser notching machine based on the determined operation.

2. The simulation apparatus of claim 1, wherein the at least one instruction further includes instructions for:

executing a 3D laser notching machine training scenario based on an operating process of the 3D laser notching machine;

executing at least one of operating the 3D laser notching machine according to the 3D laser notching machine training scenario, displaying a user action guide on the apparatus operating unit, displaying a user condition guide on the facility operating unit, or displaying a laser setting guide on the laser setting unit;

obtaining at least one of the first user action information based on the user action guide display, the first user condition information based on the user condition guide display, or the first laser setting information based on the laser setting guide display; and changing at least one of the apparatus operating unit or the facility operating unit based on at least one of the obtained first user action information, first user condition information, or the first laser setting information.

3. The simulation apparatus of claim 2, wherein the 3D laser notching machine training scenario includes a material replacement training scenario, and the material replacement training scenario includes at least one of checking a supply unit status, removing a residual amount of an electrode, connecting an electrode, or collecting a sample.

4. The simulation apparatus of claim 2, wherein the 3D laser notching machine training scenario includes a facility operation training scenario, and the facility operation training scenario includes at least one of checking an operation preparation state, operating a notching facility, or checking a punching-out state.

5. The simulation apparatus of claim 1, wherein the at least one instruction further includes instructions for:

determining one or more quality parameters for determining the quality of a material produced by the 3D laser notching machine;

calculating a value corresponding to each of the determined one or more quality parameters based on the operation of the 3D laser notching machine being executed while the operation of the 3D laser notching machine is in execution; and generating quality information related to the quality of a material generated by the 3D laser notching machine based on the calculated value corresponding to each of the one or more quality parameters.

6. The simulation apparatus of claim 5, wherein the at least one instruction further includes instructions for:

determining one or more defect scenarios among a plurality of defect scenarios related to the operation of the 3D laser notching machine; and changing at least one of the operation of the 3D laser notching machine or the quality of the material based on the determined one or more defect scenarios.

7. The simulation apparatus of claim 6, wherein the plurality of defect scenarios includes at least one of a shoulder line defect scenario in which front and rear shoulder line positions of electrodes punched out from the 3D laser notching machine are changed to lie within a predetermined abnormal range; an electrode length defect scenario in which a length of an electrode punched out from the 3D laser notching machine is changed to lie within a predetermined abnormal range; a tab height defect scenario in which a height of an electrode tab punched out from the 3D laser notching machine is changed to lie within a predetermined abnormal range; a pitch defect scenario in which the pitch spacing of electrodes at a specific period punched out from the 3D laser notching machine is changed to lie within a predetermined abnormal range; or a vision position defect scenario in which a measurement position for a vision measurement item is changed to a predetermined abnormal position.

8. The simulation apparatus of claim 7, wherein the at least one instruction further includes instructions for:

executing at least one defect scenario of the shoulder line defect scenario or the electrode length defect scenario;

obtaining at least one of second user action information operating at least a part of the 3D laser notching machine or second user condition information changing adjustment parameters of the facility operating unit;

correcting the operation of the 3D laser notching machine based on at least one of the obtained second user action information or second user condition information;

calculating a value corresponding to each of one or more quality parameters related to the quality of a material generated by the corrected 3D laser notching machine; and correcting the quality of a material generated by the corrected 3D laser notching machine based on the calculated value corresponding to each of the one or more quality parameters.

9. The simulation apparatus of claim 7, wherein the at least one instruction further includes instructions for:

executing at least one defect scenario of the tab height defect scenario or the pitch defect scenario;

obtaining at least one of second user action information operating at least a part of the 3D laser notching machine or second laser setting information changing laser parameters of the laser setting unit;

correcting the operation of the 3D laser notching machine based on at least one of the obtained second user action information or second laser setting information;

calculating a value corresponding to each of one or more quality parameters related to the quality of a material generated by the corrected 3D laser notching machine; and correcting the quality of a material generated by the corrected 3D laser notching machine based on the calculated value corresponding to each of the one or more quality parameters.

10. The simulation apparatus of claim 7, wherein the at least one instruction further includes instructions for:

executing the vision position defect scenario;

obtaining measurement position offset value change information of a vision program related to the 3D laser notching machine;

correcting the vision position based on the obtained measurement position offset value change information; and correcting the quality of a material generated by the 3D laser notching machine based on the corrected vision position.

11. The simulation apparatus of claim 8, wherein the at least one instruction further includes instructions for outputting guide information including information required to resolve the one or more defect scenarios.

12. A simulation method of a laser notching machine for secondary battery production, the method being performed by at least one processor and comprising:

executing an apparatus operating unit including a 3D laser notching machine related to the secondary battery production, a facility operating unit including a plurality of adjustment parameters for determining the operation of the 3D laser notching machine, a quality checking unit including quality information related to quality of a material produced by the 3D laser notching machine, and a laser setting unit including a plurality of laser parameters for determining operation of the 3D laser notching machine;

obtaining at least one of first user action information obtained through the apparatus operating unit, first user condition information obtained through the facility operating unit, or first laser setting information obtained through the laser setting unit;

the operation of the 3D laser notching machine based on at least one of the first user action information, the first user condition information or the first laser setting information obtained; and punching out electrodes related to the 3D laser notching machine based on the determined operation.

13. The simulation method of claim 12, further comprising:

executing a 3D laser notching machine training scenario based on an operating process of the 3D laser notching machine;

executing at least one of operating the 3D laser notching machine according to the 3D laser notching machine training scenario, displaying a user action guide on the apparatus operating unit, displaying a user condition guide on the facility operating unit, or displaying a laser setting guide on the laser setting unit;

obtaining at least one of the first user action information based on the user action guide display, the first user condition information based on the user condition guide display, or the first laser setting information based on the laser setting guide display; and changing at least one of the apparatus operating unit or the facility operating unit based on at least one of the obtained first user action information, first user condition information, or the first laser setting information.

14. The simulation method of claim 13, wherein the 3D laser notching machine training scenario includes a material replacement training scenario, and the material replacement training scenario includes at least one of checking a supply unit status, removing a residual amount of an electrode, connecting an electrode, or collecting a sample.

15. The simulation method of claim 13, wherein the 3D laser notching machine training scenario includes a facility operation training scenario, and the facility operation training scenario includes at least one of checking an operation preparation state, operating a notching facility, or checking a punching-out state.

16. The simulation method of claim 12, further comprising:

determining one or more quality parameters for determining the quality of a material produced by the 3D laser notching machine;

calculating a value corresponding to each of the determined one or more quality parameters based on the operation of the 3D laser notching machine being executed while the operation of the 3D laser notching machine is in execution; and generating the quality of a material generated by the 3D laser notching machine based on the calculated value corresponding to each of the one or more quality parameters.

17. The simulation method of claim 16, further comprising:

determining one or more defect scenarios among a plurality of defect scenarios related to the operation of the 3D laser notching machine; and changing at least one of the operation of the 3D laser notching machine or the quality of the material based on the determined one or more defect scenarios.

18. The simulation method of claim 17, wherein the plurality of defect scenarios includes at least one of a shoulder line defect scenario in which front and rear shoulder line positions of electrodes punched out from the 3D laser notching machine are changed to lie within a predetermined abnormal range, an electrode length defect scenario in which a length of an electrode punched out from the 3D laser notching machine is changed to lie within a predetermined abnormal range, a tab height defect scenario in which a height of an electrode tab punched out from the 3D laser notching machine is changed to lie within a predetermined abnormal range, a pitch defect scenario in which the pitch spacing of electrodes at a specific period punched out from the 3D laser notching machine is changed to lie within a predetermined abnormal range, or a vision position defect scenario in which a measurement position for a vision measurement item is changed to a predetermined abnormal position.

19. The simulation method of claim 18, further comprising:

executing at least one defect scenario of the shoulder line defect scenario or the electrode length defect scenario;

obtaining at least one of second user action information operating at least a part of the 3D laser notching machine or second user condition information changing adjustment parameters of the facility operating unit;

correcting the operation of the 3D laser notching machine based on at least one of the obtained second user action information or second user condition information;

calculating a value corresponding to each of one or more quality parameters related to the quality of a material generated by the corrected 3D laser notching machine; and correcting the quality of a material generated by the corrected 3D laser notching machine based on the calculated value corresponding to each of the one or more quality parameters.

20. The simulation method of claim 18, further comprising:

executing at least one defect scenario of the tab height defect scenario or the pitch defect scenario;

obtaining at least one of second user action information operating at least a part of the 3D laser notching machine or second laser setting information changing laser parameters of the laser setting unit;

correcting the operation of the 3D laser notching machine based on at least one of the obtained second user action information or second laser setting information;

calculating a value corresponding to each of one or more quality parameters related to the quality of a material generated by the corrected 3D laser notching machine; and correcting the quality of a material generated by the corrected 3D laser notching machine based on the calculated value corresponding to each of the one or more quality parameters.

21. The simulation method of claim 18, further comprising:

executing the vision position defect scenario;

obtaining measurement position offset value change information of a vision program related to the 3D laser notching machine;

correcting the vision position based on the obtained measurement position offset value change information; and correcting the quality of a material generated by the 3D laser notching machine based on the corrected vision position.

22. The simulation method of claim 19, further comprising:

outputting guide information including information required to resolve the one or more defect scenarios.

23. A computer program stored in a non-transitory computer-readable medium provided to execute the method according to claim 12 on a computer.

* * * * *